United States Patent
Park et al.

(10) Patent No.: US 10,224,541 B2
(45) Date of Patent: Mar. 5, 2019

(54) POSITIVE ELECTRODE ACTIVE MATERIAL PRECURSOR FOR LITHIUM SECONDARY BATTERY, POSITIVE ELECTRODE ACTIVE MATERIAL MANUFACTURED BY USING THEREOF, AND LITHIUM SECONDARY BATTERY INCLUDING THE SAME

(71) Applicants: IUCF-HYU (INDUSTRY-UNIVERSITY COOPERATION FOUNDATION HANYANG UNIVERSITY), Seoul (KR); ENERCERAMIC INC., Seoul (KR)

(72) Inventors: Gang-Jun Park, Seoul (KR); Hyung-Joo Noh, Bucheon-si (KR); Yang-Kook Sun, Seoul (KR); Jang-Wook Park, Bucheon-si (KR)

(73) Assignees: IUCF-HYU (INDUSTRY-UNIVERSITY COOPERATION FOUNDATION HANYANG UNIVERSITY), Seoul (KR); ENERCERAMIC INC., Seoul (KR)

( * ) Notice: Subject to any disclaimer, the term of this patent is extended or adjusted under 35 U.S.C. 154(b) by 337 days.

(21) Appl. No.: 14/926,282

(22) Filed: Oct. 29, 2015

(65) Prior Publication Data

US 2016/0049647 A1 Feb. 18, 2016

Related U.S. Application Data

(63) Continuation-in-part of application No. 14/118,661, filed as application No. PCT/KR2013/005084 on Jun. 10, 2013, now Pat. No. 9,337,487.

(30) Foreign Application Priority Data

Jun. 8, 2012 (KR) .................. 10-2012-0061836
Oct. 16, 2012 (KR) .................. 10-2012-0115047
(Continued)

(51) Int. Cl.
*H01M 4/36* (2006.01)
*H01M 10/0525* (2010.01)
(Continued)

(52) U.S. Cl.
CPC .......... *H01M 4/366* (2013.01); *C01G 53/006* (2013.01); *C01G 53/50* (2013.01); *H01M 4/505* (2013.01);
(Continued)

(58) Field of Classification Search
None
See application file for complete search history.

(56) References Cited

U.S. PATENT DOCUMENTS

2004/0175618 A1* 9/2004 Inoue ............... C01G 51/42
429/231.1
2004/0265693 A1* 12/2004 Kurachi ............ C01G 51/42
429/231.1
(Continued)

FOREIGN PATENT DOCUMENTS

KR 1020140119621 A 10/2014

*Primary Examiner* — Katie L. Hammer
(74) *Attorney, Agent, or Firm* — Sughrue Mion, PLLC

(57) ABSTRACT

Positive electrode active materials are provided. The positive electrode active materials includes a primary particle formed of a plurality of metals including a first metal and a secondary particle formed of at least one of the primary particle. The secondary particle includes a core part, a shell part, a seed region where the primary particle having concentration gradient of the first metal is disposed and a maintain region where the primary particle having constant (Continued)

concentration of the first metal is disposed, the seed region adjacent to the core part and a maintain region adjacent to the sell part, and length of the seed region in a direction from the core part to the shell part is 1 µm.

19 Claims, 26 Drawing Sheets

(30) Foreign Application Priority Data

Jun. 10, 2013 (KR) .......................... 10-2013-0065711
Oct. 29, 2014 (KR) .......................... 10-2014-0148419

(51) Int. Cl.
*C01G 53/00* (2006.01)
*H01M 4/505* (2010.01)
*H01M 4/525* (2010.01)
H01M 4/131 (2010.01)
H01M 4/02 (2006.01)

(52) U.S. Cl.
CPC ......... *H01M 4/525* (2013.01); *C01P 2002/80* (2013.01); *C01P 2004/04* (2013.01); *H01M 4/131* (2013.01); *H01M 10/0525* (2013.01); *H01M 2004/021* (2013.01)

(56) References Cited

U.S. PATENT DOCUMENTS

2009/0029253 A1* 1/2009 Itou ....................... H01M 4/525
　　　　　　　　　　　　　　　　　　　　　　429/223
2012/0080649 A1* 4/2012 Koenig, Jr. .......... C01G 53/006
　　　　　　　　　　　　　　　　　　　　　　252/519.2

\* cited by examiner (a)  (b)

(a) 　(b)

(a) 　(b)

(a)

(b)

(a)

(b)

(a)   (b)

(a)  (b)

(a)

(b)

(c)

(d)

POSITIVE ELECTRODE ACTIVE MATERIAL PRECURSOR FOR LITHIUM SECONDARY BATTERY, POSITIVE ELECTRODE ACTIVE MATERIAL MANUFACTURED BY USING THEREOF, AND LITHIUM SECONDARY BATTERY INCLUDING THE SAME

CROSS-REFERENCE TO RELATED APPLICATION

This application is a continuation-in-part application of application Ser. No. 14/118,661 filed on Nov. 19, 2013 which is a 371 of international application PCT/KR2013/005084 filed Jun. 10, 2013 which claims priority from Korean Patent Application 10-2012-0061836 filed Jun. 8, 2012, Korean Patent Application 10-2012-0115047 filed Oct. 16, 2012 and Korean Patent Application 10-2013-0065711 filed Jun. 10, 2013, the entire contents of each of which are incorporated herein by reference. This application further claims priority from Korean Patent Application No. 10-2014-0148419 filed Oct. 29, 2014, the entire contents of which is incorporated herein by reference.

FIELD OF THE INVENTION

The present disclosure relates to a positive electrode active material precursor for a lithium secondary battery, a positive electrode active material manufactured by using thereof, and a lithium secondary battery comprising the same. More specifically, it relates to a positive electrode active material precursor for a lithium secondary battery as a secondary particle, lithium composite oxide, comprising a plurality of transition metals and formed by gathering of a plurality of primary particles having different a-axis direction length to c-axis direction length ratio, wherein the a-axis direction length to c-axis direction length ratio of the primary particle making up the secondary particle is increased from the core part to the shell part of the secondary particle; a positive electrode active material; and a lithium secondary battery comprising the same.

BACKGROUND

Recently, according to the rapid progress of miniaturization, weight reduction and high-performance of electronics, electronic equipments and communication devices, improvement of performance of a secondary battery, which is used as a power supply of the product, is greatly required. A secondary battery satisfying these requirements may be a lithium secondary battery, and the lithium secondary battery may be largely classified into a lithium sulfur battery using a sulfur-based material as a positive electrode active material and a lithium ion battery using a lithiated transition metal oxide as a positive electrode active material.

The positive electrode active material is a material playing the most importance role to the battery performance and safety of the lithium secondary battery, and it may be a chalcogenide compound. For example, composite metal oxides such as $LiCoO_2$, $LiMn_2O_4$, $LiNiO_2$, $LiNi_{1-x}Co_xO_2$ ($0 \leq x \leq 1$) and $LiMnO_2$ are being studied. This positive electrode active material is mixed to a conducting material such as carbon black, a binder and a solvent to prepare a positive electrode active material slurry composition, and then the composition is coated on a thin metal plate such as aluminum foil to be used as a positive electrode of a lithium ion secondary battery.

Among the positive electrode active materials, the Mn-based positive electrode active material such as $LiMn_2O_4$ and $LiMnO_2$ is attractive material because it is easy to synthesize, cheap and environment-friendly, but it has a shortcoming of small capacity. The Co-based positive electrode active material such as $LiCoO_2$ shows good electric conductivity, high battery voltage and excellent electrode characteristics, but it has a shortcoming of expensive price.

In order to overcome the shortcomings of the Co-based positive electrode active material such as $LiCoO_2$, in recent, researches for developing high capacity batteries are in progress actively. Further, compared with a mobile field such as mobile phone, personal computer, a power tool field such as power tool and a power-driven field such as electric motor motorcycle and electric motor assistance bicycle have large load fluctuation to a power supply, and also used for a long time continuously. Accordingly, high output and high capacity power supplies are demanded.

In general, in a battery, high capacity and high output are contradictory performances, and are difficult to be compatible. For example, a non-aqueous electrolyte battery such as a lithium ion secondary battery as a representative high capacity-type secondary battery can be continuously discharged for a long time due to low load of about 0.2 C. Accordingly, it is mainly used as a power supply for a mobile field and the like, but current density per electrode area at low load is only 0.01 $A/cm^2$. For this reason, the high capacity-type non-aqueous electrolyte battery is not suitable for a power supply for high load used in a power-driven field requiring discharge at high current where current density is 0.1 $A/cm^2$ and more such as power-driven motorcycle and power-driven assistance bicycle.

Further, in the said power field, pulse discharge characteristic of high current becomes important due to frequent on/off of the power supply, but enough pulse discharge capacity cannot be obtained by the high capacity-type non-aqueous electrolyte battery used in the mobile field and the like. On the other hand, high current discharge is possible by a high output-type power supply capacitor and the like, but long-term continuous discharge is difficult due to very small capacity.

SUMMARY

In order to solve the above-described problems, the present invention is objected to provide a positive electrode active material precursor for a lithium secondary battery, which has a novel structure exerting high capacity by controlling shape of a primary particle making up a secondary particle and concentration gradient of metal ions in the primary particle, and a positive electrode active material manufactured by using thereof.

Further, the present invention is objected to provide a lithium secondary battery comprising the positive electrode active material for a lithium secondary battery.

In order to accomplish one object of the present invention, a positive electrode active material precursor for a lithium secondary battery, which is a secondary particle comprising a plurality of transition metals, formed by gathering a plurality of primary particles having different a-axis direction length to c-axis direction length ratio, and having average particle diameter of the range from 4 to 20 μm, wherein the a-axis direction length to c-axis direction length ratio of the primary particle making up the secondary particle is increased from the core part to the shell part of the secondary particle.

In the positive electrode active material precursor for a lithium secondary battery of the present invention, at least one metal making up the primary particle may show continuous concentration gradient in the primary particle.

In the positive electrode active material precursor for a lithium secondary battery of the present invention, the a-axis orientation of the primary particle may be headed to the core part of the secondary particle, and the particles may be adjoining each other and grow to a fixed route. In the positive electrode active material precursor for a lithium secondary battery of the present invention, contact resistance in the particle may be significantly reduced because the primary particles are continuously arranged while headed to the core part as described above, and also, output may be improved and high capacity characteristic may be obtained in accordance with that insertion of lithium ions becomes easier.

In the positive electrode active material precursor for a lithium secondary battery of the present invention, the a-axis direction length of the primary particle may be in the range of 0.01 to 0.95 of the secondary particle radius.

In the positive electrode active material precursor for a lithium secondary battery of the present invention, the primary particle may be in the form of rectangular parallelepiped, cube, elliptical ball or inclined rectangular parallelepiped.

In the positive electrode active material precursor for a lithium secondary battery of the present invention, the secondary particle may comprise a first interior, wherein the a-axis direction length to c-axis direction length ratio of the primary particle is constant; and a second interior, wherein the a-axis direction length to c-axis direction length ratio of the primary particle is increasing.

In the positive electrode active material precursor for a lithium secondary battery of the present invention, the a-axis direction length to c-axis direction length ratio of the primary particle of the first interior may be 0.5 to 2.0, and the a-axis direction length to c-axis direction length ratio of the primary particle of the second interior may be 2 to 30.

In the positive electrode active material precursor for a lithium secondary battery of the present invention, at least one metal making up the primary particle of the second interior may have continuous concentration in the primary particle.

In the positive electrode active material precursor for a lithium secondary battery of the present invention, the continuous concentration gradient slopes of the metal showing continuous concentration gradient in the primary particle may be two or more.

In the positive electrode active material precursor for a lithium secondary battery of the present invention, the secondary particle may further comprise a surface maintain region, where the metal concentration is constant, on the outside.

Further, the present invention provides a positive electrode active material for a lithium secondary battery, which is a secondary particle comprising a plurality of transition metals, formed by gathering of a plurality of primary particles having different a-axis direction length to c-axis direction length ratio, and having average particle diameter of the range from 4 to 20 μm, wherein the a-axis direction length to c-axis direction length ratio of the primary particle making up the secondary particle is increased from the core part to the shell part of the secondary particle.

In the positive electrode active material for a lithium secondary battery of the present invention, at least one metal ion making up the primary particle may show continuous concentration gradient in the primary particle.

In the positive electrode active material for a lithium secondary battery of the present invention, the concentration gradient slopes of the metal showing concentration gradient in the primary particle may be two or more.

In the positive electrode active material for a lithium secondary battery of the present invention, the a-axis orientation of the primary particle may be headed to the core part of the positive electrode active material as a secondary particle, and the particles may be adjoining each other and grow to a fixed route. In the positive electrode active material for a lithium secondary battery of the present invention, contact resistance in the particle may be significantly reduced because the primary particles are continuously arranged while headed to the core part as described above, and also, output may be improved and high capacity characteristic may be obtained in accordance with that insertion of lithium ions becomes easier.

In the positive electrode active material for a lithium secondary battery of the present invention, oxidation numbers, +2 and +3, of Ni may be mixed from the particle surface to the part having radius 0.1 to 0.7 time of the particle radius.

In the positive electrode active material for a lithium secondary battery of the present invention, the primary particle may be in the form of rectangular parallelepiped, cube, elliptical ball or inclined rectangular parallelepiped.

In the positive electrode active material for a lithium secondary battery of the present invention, the a-axis direction length of the primary particle may be in the range of 0.01 to 0.95 of the positive electrode active material radius.

The positive electrode active material for a lithium secondary battery of the present invention may comprises a first interior, wherein the a-axis direction length to c-axis direction length ratio of the primary particle is constant; and a second interior, wherein the a-axis direction length to c-axis direction length ratio of the primary particle is increasing.

In the positive electrode active material for a lithium secondary battery of the present invention, the a-axis direction length to c-axis direction length ratio of the primary particle of the first interior may be 0.8 to 1.2, and the a-axis direction length to c-axis direction length ratio of the primary particle of the second interior is 3 to 12.

In the positive electrode active material for a lithium secondary battery of the present invention, the first interior of the positive electrode active material for a lithium secondary battery may be expressed by an empirical formula of $Li_\delta[Ni_{1-(a+b+c)}CO_aMn_bM_c]O_2$ ($1.0 \leq \delta \leq 1.2$, $0.00 \leq a \leq 0.40$, $0.00 \leq b \leq 0.35$, $0.00 \leq c \leq 0.05$, $0.05 \leq a+b+c \leq 0.5$), and the secondary interior of the secondary particle may be expressed by an empirical formula of $Li_\delta[Ni_{1-(x+y+z)}Co_xMn_yM_z]O_2$ ($1.0 \leq \delta \leq 1.2$, $0.07 \leq x \leq 0.3$, $0.2 \leq y \leq 0.5$, $0.00 \leq z \leq 0.1$, $0.3 \leq x+y+z \leq 0.7$), wherein M is at least one selected from the group consisting elements Al, Mg, Fe, Cr, V, Ti, Mo, Sc, Ce and La.

In the positive electrode active material for a lithium secondary battery of the present invention, in the first interior of the secondary particle, the metal ion concentration may be constant, and, in the second interior, at least one metal making up the primary particle of the second interior may have continuous concentration gradient in the primary particle.

In the positive electrode active material for a lithium secondary battery of the present invention, the positive electrode active material may show concentration gradient of at least one metal making up the secondary particle from the core part to the shell part of the secondary particle.

Namely, the positive electrode active material for a lithium secondary battery of the present invention is characterized that metals show concentration gradient also in the primary particle itself, and metal concentration is gradually changed in the primary particle, and thereby metals may show concentration gradient from the core part to the shell part of the positive electrode active material in the positive electrode active material as a secondary particle, which is formed by gathering of the primary particles.

In the present invention, there is no limit on the form that metals show the concentration gradient in the positive electrode active material. Namely, the concentrations of all metal may show concentration gradient in the entire positive electrode active material; in the entire positive electrode active material, concentrations of some transition metal may be constant while concentrations of other transition metals may show concentration gradient; or in some part of the positive electrode active material, Ni concentration may be constant while Co and Mn may show concentration gradient, and in the part connected thereto, Co concentration may be constant while Ni and Mn may show concentration gradient.

In the positive electrode active material for a lithium secondary battery of the present invention, the positive electrode active material may further comprise a surface maintain region, where the concentrations of metal ions are constant. Namely, stability and electrochemical characteristic of a structure itself may be improved by further forming a surface maintain region, where the concentrations of all transition metal making up the positive electrode active material are constant, on the outside of the particle.

The present invention further provides a lithium secondary battery comprising the positive electrode active material according to the present invention.

Further, the present invention provides a positive electrode active material, which comprises a primary particle formed of a plurality of metals including a first metal and a secondary particle formed of at least one of the primary particle. In the positive electrode active material, the secondary particle may comprise a core part, a shell part, a seed region where the primary particle having concentration gradient of the first metal is disposed and a maintain region where the primary particle having constant concentration of the first metal is disposed. The seed region may be adjacent to the core part and a maintain region may be adjacent to the sell part. Length of the seed region in a direction from the core part to the shell part may be 1 μm.

In the positive electrode active material of the present invention, the primary particle may comprise a seed element disposed in the seed region and a maintain element disposed in the maintain region. The seed element may have concentration gradient of the first metal. The maintain element may have constant concentration of the first metal and extend to the shell part from the core part.

In the positive electrode active material of the present invention, the secondary particle may further comprise an intermediate region disposed between the seed region and the maintain region, the primary particle may further comprise an intermediate element disposed in the intermediate region, and the intermediate element may comprise a gradient portion having concentration gradient of the first metal and a uniform portion having constant concentration of the first metal.

In the positive electrode active material of the present invention, concentration of the first metal in the seed element may decreasing as going in a direction from the core part to the shell part.

In the positive electrode active material of the present invention, the seed element may be higher than the maintain element in concentration of the first metal.

In the positive electrode active material of the present invention, the seed element and/or the maintain element may have rod shape extending to radiate direction from the core part to the shell part.

In the positive electrode active material of the present invention, wherein the plurality of the metal may further comprise a second metal and a third metal, at least one of the second metal and the third metal may show increasing concentration gradient in the seed element.

In the positive electrode active material of the present invention, the maintain region may be longer than the seed region in a direction from the core part to the shell part.

In the positive electrode active material of the present invention, the first metal may comprise nickel (Ni).

Further, the present invention provides a positive electrode active material, which comprises a primary particle having an intermediate element and a secondary particle formed of at least one of the primary particle. The intermediate element may include a gradient portion which shows concentration gradient of a first metal and a uniform portion which extends from an end of the gradient portion. The uniform portion may show constant concentration of the first metal.

In the positive electrode active material of the present invention, the gradient portion and the uniform portion may be in one body.

In the positive electrode active material of the present invention, the secondary particle may comprise a core part, a shell part, a seed region adjacent to the core part and a maintain region adjacent to the shell part. The primary particle may comprise a seed element disposed in the seed region a maintain element disposed in the maintain region. The seed element may have concentration gradient of the first metal and the maintain element may extend toward the shell part from the seed element and have constant concentration of the first metal.

In the positive electrode active material of the present invention, the intermediate element may be disposed between the seed element and the maintain element, the gradient portion may be adjacent to the seed element and the uniform portion may be adjacent to the maintain element.

In the positive electrode active material of the present invention, the concentration of the first metal in the gradient portion may be decreasing as approaching to the uniform portion.

Further, the present invention provides a secondary battery, which comprises a positive electrode active material according to the above embodiments, a negative electrode disposed on the positive electrode and an electrolyte between the positive electrode and the negative electrode.

BRIEF DESCRIPTION OF THE DRAWINGS

The above and other objects and features of the present invention will become apparent from the following description of the invention taken in conjunction with the following accompanying drawings, which respectively show.

DETAILED DESCRIPTION OF THE EMBODIMENTS

Figure 1:
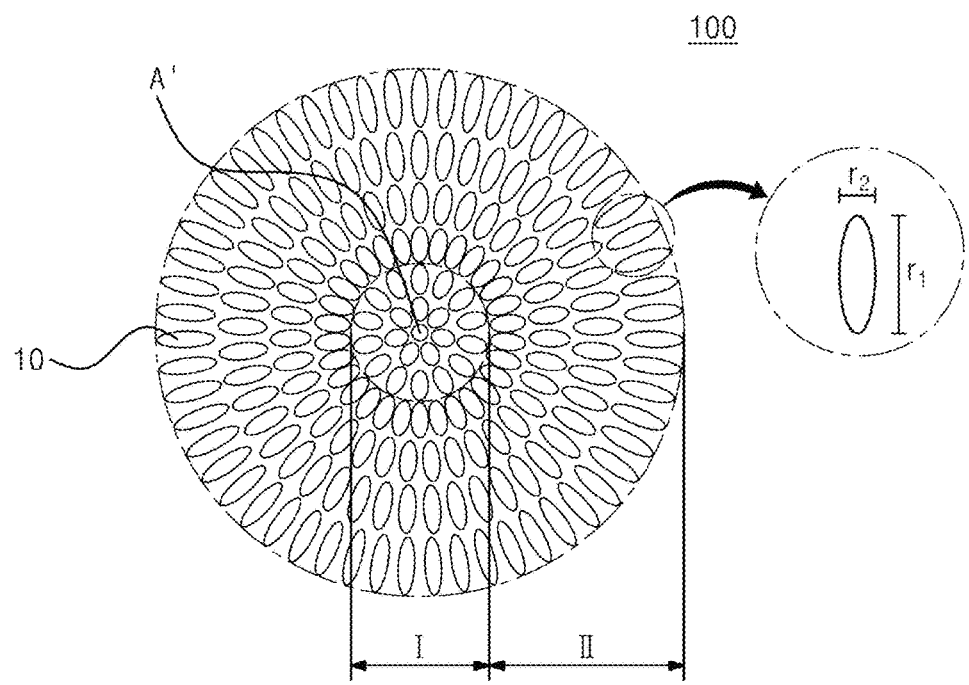
FIG. 1: an internal structure of the positive electrode active material for a lithium secondary battery according to the present invention.

The inventive concepts will now be described more fully hereinafter with reference to the accompanying drawings, in which exemplary embodiments of the inventive concepts are shown. The advantages and features of the inventive concepts and methods of achieving them will be apparent from the following exemplary embodiments that will be described in more detail with reference to the accompanying drawings. It should be noted, however, that the inventive concepts are not limited to the following exemplary embodiments, and may be implemented in various forms. Accordingly, the exemplary embodiments are provided only to disclose the inventive concepts and let those skilled in the art know the category of the inventive concepts. In the drawings, embodiments of the inventive concepts are not limited to the specific examples provided herein and are exaggerated for clarity.

The terminology used herein is for the purpose of describing particular embodiments only and is not intended to limit the invention. As used herein, the singular terms "a," "an" and "the" are intended to include the plural forms as well, unless the context clearly indicates otherwise. As used herein, the term "and/or" includes any and all combinations of one or more of the associated listed items. It will be understood that when an element is referred to as being "connected" or "coupled" to another element, it may be directly connected or coupled to the other element or intervening elements may be present.

Similarly, it will be understood that when an element such as a layer, region or substrate is referred to as being "on" another element, it can be directly on the other element or intervening elements may be present. In contrast, the term "directly" means that there are no intervening elements. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

FIG. 1 is an internal cross-sectional image of the positive electrode active material for a lithium secondary battery according to the present invention.

As shown in FIG. 1, the positive electrode active material for a lithium secondary battery 100 according to the present invention is a secondary particle formed by gathering a plurality of primary particles 10 as a small crystal, and it is characterized that the a-axis direction length $r_1$ to c-axis direction length $r_2$ ratio of the primary particle is increased toward a direction from A, a central point, to A', i.e., from the center to the surface of the secondary particle.

Figure 2:
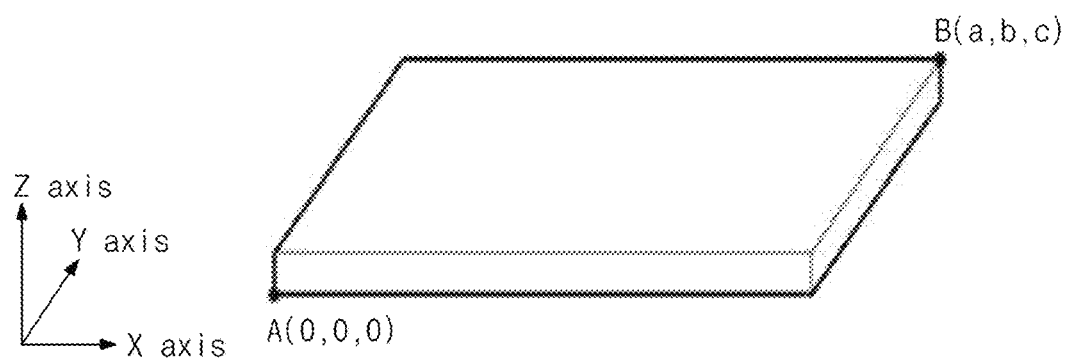
FIG. 2: a method for expressing the structure of the positive electrode active material for a lithium secondary battery according to the present invention.

FIG. 2 is a drawing schematically describing that the primary particle of the positive electrode active material for a lithium secondary battery has the coordinates B (a, b, c) when locating the primary particle of the positive electrode active material for a lithium secondary battery according to the present invention to the origin A (0, 0, 0) of the three-dimensional coordinates having x-axis, y-axis and z-axis. Accordingly, the "a", "b" and "c" are judged to be corresponded to length, width and height of an imaginary cube illustrated in FIG. 2.

In one embodiment of the present invention as shown in FIG. 1, the secondary particle is made up of the first interior I where the a-axis direction length to c-axis direction length ratio is constant; and the second interior II where the a-axis direction length to c-axis direction length ratio is increasing. In one embodiment of the present invention, the second interior is characterized that the a-axis orientation of the primary particle is headed to the center of the positive electrode active material as a secondary particle, and the particles are adjoining each other and grow to a fixed route.

Figure 3:
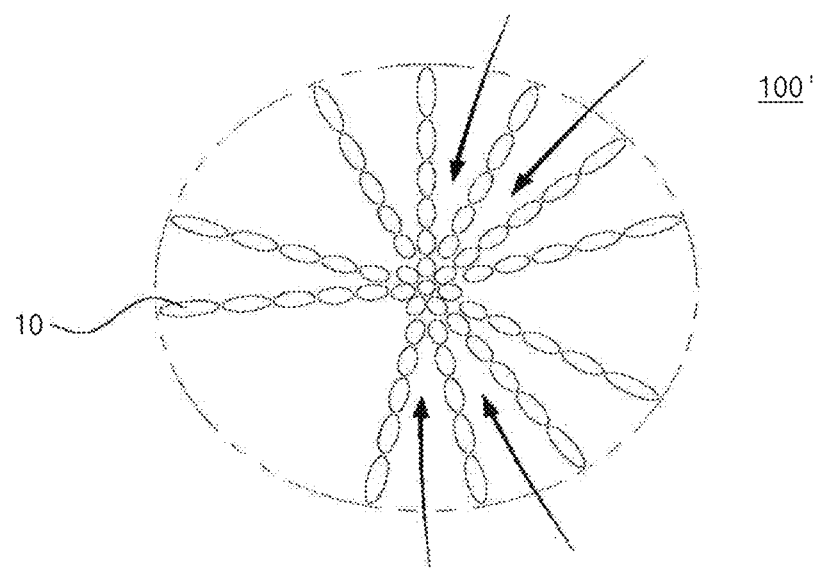
FIG. 3: a TEM image of the positive electrode active material for a lithium secondary battery manufactured by one embodiment of the present invention.

FIG. 3 is another cross-sectional image of the positive electrode active material for a lithium secondary battery 100' according to the present invention. As shown in FIG. 3, in one embodiment of the present invention, the positive electrode active material for a lithium secondary battery 100 is characterized that the a-axis orientation of the primary particle 10 is headed to the core part of the active material as a secondary particle, and the primary particles are adjoining each other and grow to a fixed route. In the positive electrode active material for a lithium secondary battery according to the present invention, wherein the a-axis orientation of the primary particle is headed to the core part and the adjoined particles grow to a fixed route as described above, an electrolyte solution is delivered to the inside of the positive electrode active material for a lithium secondary battery 100', and a lithium ion can be easily inserted to the space formed between the fixed routes, and thereby the battery output may be improved, electric energy generated inside of the particle can be effectively delivered due to reduced contact resistance between the particles. As a result, high capacity can be displayed.

In one embodiment of the present invention, the primary particle of the first interior is characterized that the a-axis direction length to c-axis direction length ratio of the primary particle of the first interior may be 0.5 to 2.0, and the a-axis direction length to c-axis direction length ratio of the primary particle of the second interior may be 2 to 30.

Namely, the positive electrode active material for a lithium secondary battery 100 according to one embodiment of the present invention is characterized that primary particles of relatively circular type having width and length of 0.8 to 1.2 are formed in the interior, and primary particles having increased aspect ratio as going to the surface are agglutinated. In the present invention, the a-axis direction length to c-axis direction length ratio is highly increased in the second interior, compared with the first interior.

In one embodiment of the present invention, it is characterized that the a-axis direction length of the primary particle is in the range of 0.01 to 0.95 of the secondary particle radius. In the present invention, the primary particles are adjoined each other and grow to a fixed route, but in the range thereof, it is preferred that the a-axis direction length of the primary particle is in the range of 0.01 to 0.95 of the secondary particle radius.

In one embodiment of the present invention, it is characterized that the first interior of the secondary particle of the positive electrode active material for a lithium secondary battery is expressed by an empirical formula of $Li_\delta[Ni_{1-(a+b+c)}Co_aMn_bM_c]O_2$ ($1.0 \leq \delta \leq 1.2$, $0.00 \leq a \leq 0.40$, $0.00 \leq b \leq 0.35$, $0.00 \leq c \leq 0.05$, $0.05 \leq a+b+c \leq 0.5$), and the secondary interior of the secondary particle of the positive electrode active material for a lithium secondary battery is expressed by an empirical formula of $Li_\delta[Ni_{1-(x+y+z)}Co_xMn_yM_z]O_2$ ($1.0 \leq \delta \leq 1.2$, $0.07 \leq x \leq 0.3$, $0.2 \leq y \leq 0.5$, $0.00 \leq z \leq 0.1$, $0.3 \leq x+y+z \leq 0.7$), wherein M is at least one selected from the group consisting elements Al, Mg, Fe, Cr, V, Ti, Mo, Sc, Ce and La. Namely, in one embodiment of the present invention, the positive electrode active material for a lithium secondary battery is characterized by high Ni content in the first interior, and low Ni content and high Mn content in the second interior.

In the positive electrode active material according to the present invention, the secondary particle of the positive electrode active material for a lithium secondary battery is characterized that oxidation numbers, +2 and +3, of Ni are mixed from the particle surface to the part having radius 0.1 to 0.7 time of the particle radius, i.e., at the part where the active material particles are directly contacted to an electrolyte solution. In accordance with mixing the oxidation numbers of Ni, higher oxidation number than the average oxidation number of Ni used in the existing positive electrode active material is maintained, and electric charge also becomes higher as the oxidation number of Ni becomes higher, thereby Coulomb force between the transition metal atom and oxygen is also increased. Accordingly, a stable binding structure and higher binding force between the transition metal atom and oxygen can be obtained.

In one embodiment of the present invention, it is characterized that at least one metal making up the primary particle of the positive electrode active material for a lithium secondary battery shows continuous concentration gradient in the primary particle, and particularly, at least one metal making up the primary particle existing in the second interior of the secondary particle shows continuous concentration gradient in the primary particle itself.

In the present invention, the positive electrode active material for a lithium secondary battery grows while also showing continuous concentration gradient inside of the primary particle. Further, the a-axis orientation of the primary particle is headed to the core part of the positive electrode active material as a secondary particle, and the particles are adjoining each other and grow to a fixed route.

EXAMPLE

Hereinafter, Examples and Comparative Example will be described. The Examples are presented for illustrative purposes only, and do not limit the present invention.

<Example 1> Manufacture of Precursor and Active Material Having Constant Mn Concentration in Entire Particle and Showing Concentration Gradients of Ni and Co in Entire Particle Distilled water 4 liter was poured into a coprecipitation reactor (Volume: 4 L, Power of a rotary motor: 80 W or more), and then nitrogen gas was supplied into the reactor at the rate of 0.5 liter/min to remove dissolved oxygen followed by stirring at 1000 rpm while keeping the reactor temperature at 50° C.

In order to make the Mn concentration in the entire particle constant as 0.25 and concentration gradients of Co and Ni transition metal ions, first of all, 2.4 M metal aqueous solution, wherein nickel sulfate, cobalt sulfate and manganese sulfate are mixed at the molar ratio of 75:0:25 was continuously put into the reactor at the rate of 0.3 liter/hour, and 4.8 mol ammonia solution was continuously put into the reactor at the rate of 0.03 liter/hour. Further, for adjusting pH, 4.8 mol sodium hydroxide solution was supplied thereto to keep pH at 11. Impeller speed was controlled to 1000 rpm. Average retention time of the resulting solution in the reactor became about 6 hours by controlling flow rate. After fixing the volume of the metal aqueous solution of nickel sulfate, cobalt sulfate and manganese sulfate, which was supplied, to 4 L at the time when the particle size of the composite metal hydroxide became 2-5 µm, concentration was changed until the molar ratio of nickel sulfate, cobalt sulfate and manganese sulfate of the metal aqueous solution became from 75:0:25 to 55:20:25, and the reaction was continued with the changing metal aqueous solution. The metal composite hydroxide was filtered and washed with water followed by drying in a 110° C. hot air dryer for 15 hours, thereby a metal composite hydroxide as a positive electrode active material precursor was manufactured.

The metal composite hydroxide manufactured as described above and lithium hydroxide (LiOH) were mixed at the molar ratio of 1:1.07, heated at the rate of 2° C./min, and then kept at 500° C. for 10 hours for conducting pre-calcination. Then, the resulting material was calcined at 780° C. for 20 hours to obtain positive electrode active material powder of Example 1-1, wherein the first interior was constant as $Li[Ni_{0.75}Mn_{0.25}]O_2$, and in the second interior, the Mn concentration was maintained as 0.25 from $Li[Ni_{0.75}Mn_{0.25}]O_2$ to $Li[Ni_{0.55}Co_{0.20}Mn_{0.25}]O_2$, and Ni and Co have continuous constant concentration gradient in the entire particle, and average concentration in the particle was expressed by $Li(Ni_{0.60}Co_{0.15}Mn_{0.25})O_2$.

The procedure of Example 1-1 was repeated except for continuing the reaction as maintaining the said molar ratio when the molar ratio of the metal aqueous solution reached 55:20:25 during the particle forming process for further comprising a surface maintain regions having thickness of 0.2 µm, 0.5 µm and 1.0 µm, respectively, so as to obtain spherical nickel-manganese-cobalt composite hydroxides of Examples 1-2 to 1-4 containing the second interior having concentration gradient and a surface maintain region.

Comparative Example 1

Particles having constant metal ion concentration expressed by $Li(Ni_{0.60}Co_{0.15}Mn_{0.25})O_2$ in the entire particle were manufactured.

<Test Example> TEM Imaging

Approximate core parts of the precursors and the active material particles manufactured in Example 1-1, Example 1-3 and Example 1-4, and the powder manufactured in Comparative Example 1 were cut with a hydrogen ion beam, and samples for measurement were prepared. Then, TEM images of each sample were taken, and the results were shown in FIGS. 4 to 8.

Figure 4:
FIG. 4: a TEM image of the cross-section of the positive electrode active material precursor and the positive electrode active material powder, which are manufactured in one Example of the present invention and have concentration gradient.
Figure 4:
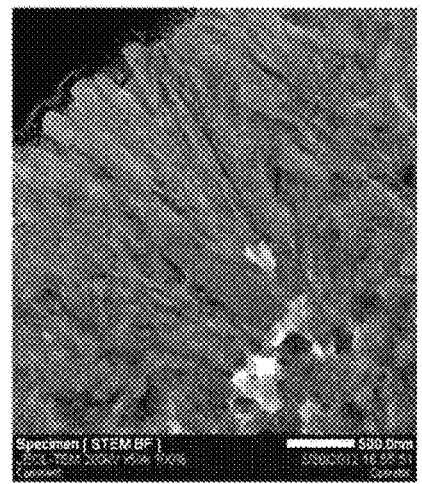
Figure 5:
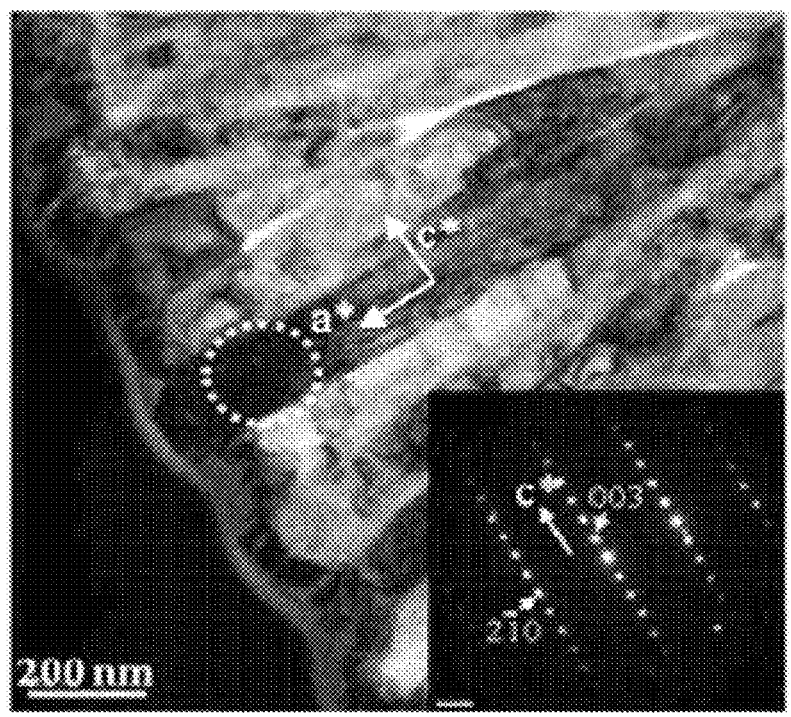
FIG. 5: an image indicating an a-axis and a c-axis in a positive electrode active material powder.

FIG. 4 is a TEM image of the cross-section of the precursor (a) and the positive electrode active material powder (b), which were manufactured according to Example 1-1 and have concentration gradient in the entire particle, and FIG. 5 is an image indicating a-axis and a c-axis in the positive electrode active material powder manufactured according to Example 1-1. As shown in FIG. 4 and FIG. 5, it was confirmed that, in the primary particles of the positive electrode active material powder and the precursor, which were manufactured according to Example 1-1 and had concentration gradient in the entire particle, the a-axis direction length to c-axis direction length ratio was increased from the core part to the shell part of the secondary particle, and the primary particles were arranged side by side toward the core part of the particle.

Figure 6:
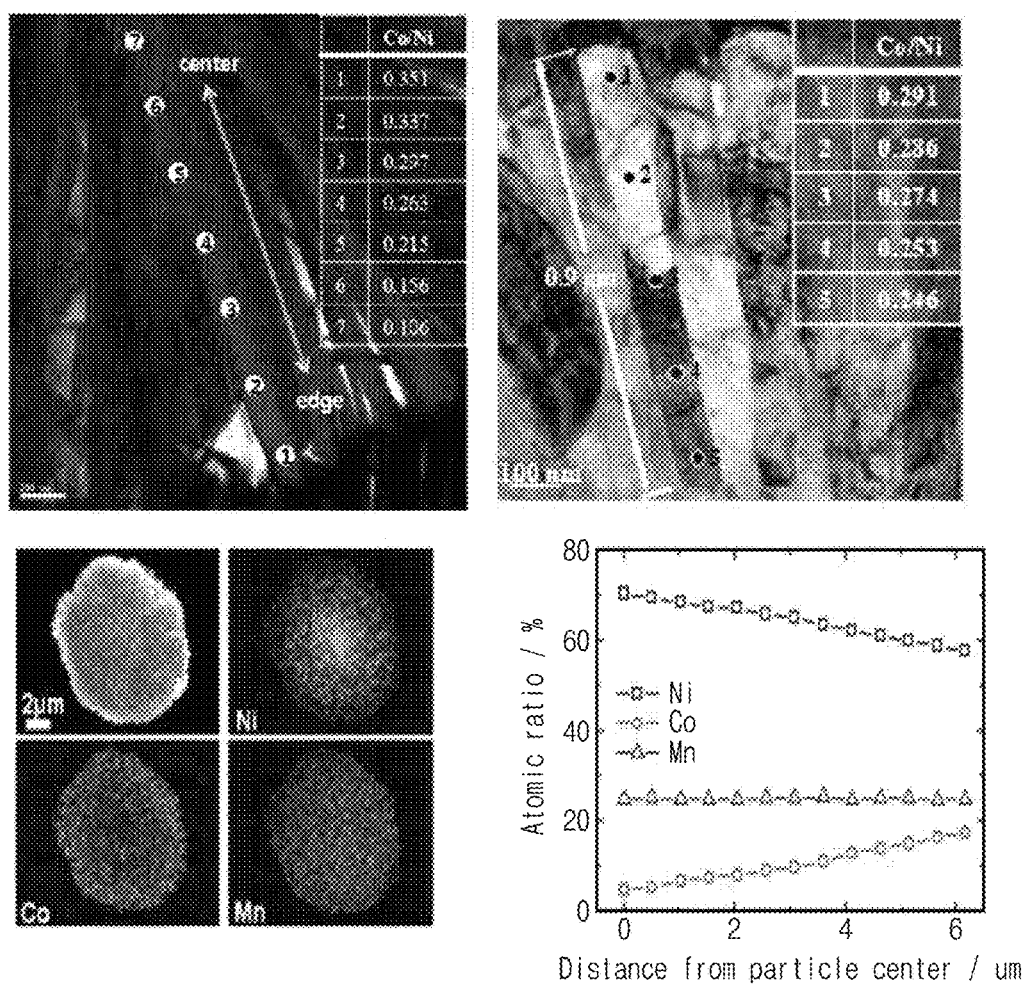
FIG. 6: a result of measuring Co/Ni ratio in the primary particle of the positive electrode active material precursor and the positive electrode active material powder manufactured in one Example of the present invention.

FIG. 6 represents the result of measuring Co/Ni ratios in the primary particle of the precursor (a) and the positive electrode active material (b) manufactured according to Example 1-1. In FIG. 6, it was confirmed that the Co/Ni ratios in the primary particle of the precursor and the positive electrode active material were gradually changed, and as a result, the Co/Ni ratio at the surface part was higher than the Co/Ni ratio at the center part.

Figure 7:
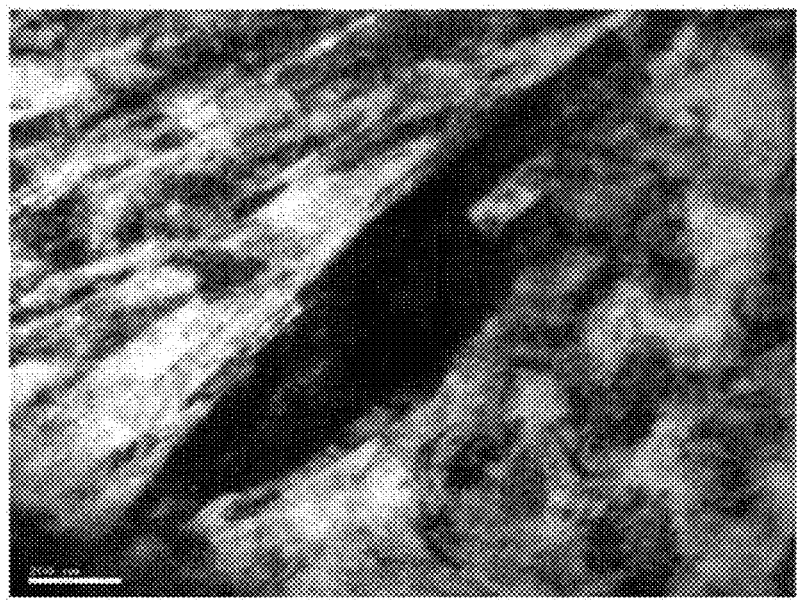
FIG. 7 and FIG. 8: TEM images of the positive electrode active material for a lithium secondary battery manufactured in one Example of the present invention.
Figure 8:
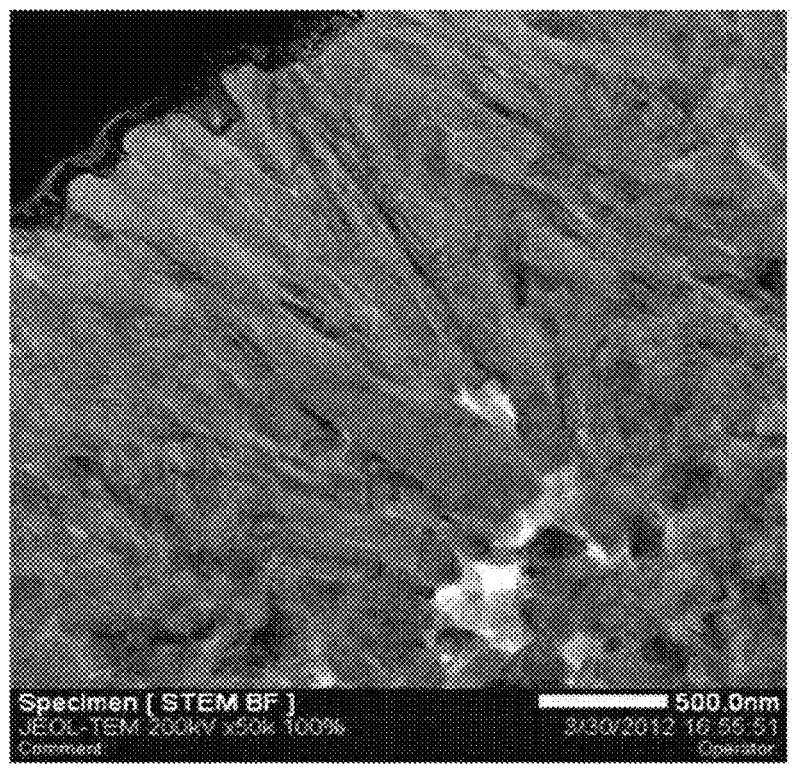

FIGS. 7 and 8 are TEM images measuring the cross sections of the active materials manufactured in Examples 1-3 and 1-4, which had a surface maintain region having thickness of 0.5 µm and 1.0 µm, respectively. In FIG. 7 and FIG. 8, it was confirmed that the primary particles had orientation toward the core part even when the surface maintain region was formed, and the a-axis direction length to c-axis direction length ratio was increasing.

Figure 9:
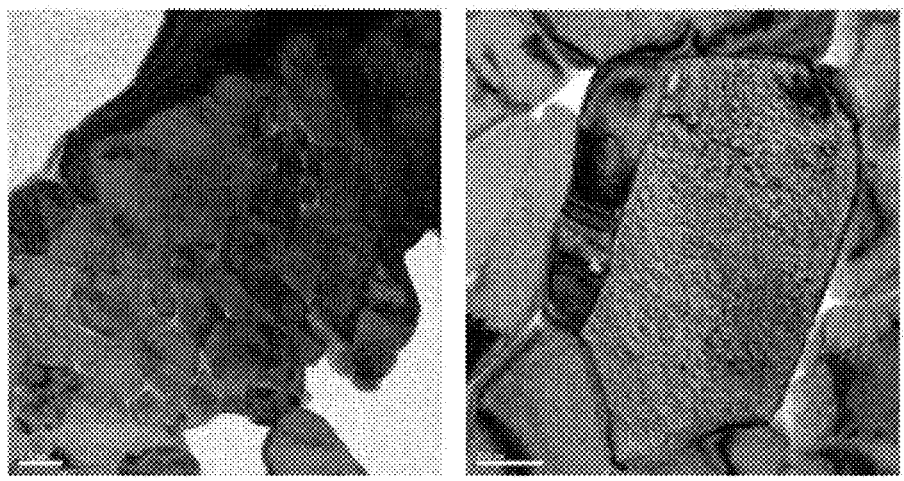
FIG. 9: a TEM image of the positive electrode active material for a lithium secondary battery manufactured in one Comparative Example of the present invention.

FIG. 9 represents a TEM image of the cross-section of the positive electrode active material, which was manufactured in Comparative Example 1 and had constant metal concentration of $Li(Ni_{0.60}Co_{0.15}Mn_{0.25})O_2$ in the entire particle. It was confirmed that the average particle concentration was identical with that of Example 1 as $Li(Ni_{0.60}Co_{0.15}Mn_{0.25})O_2$, but unlike the positive electrode active material having concentration gradient in the entire particle, the a-axis direction length to c-axis direction length ratio was constant and there was no orientation toward the core part of the particle.

<Test Example> Measuring Battery Characteristic

Batteries were manufactured by using the active material particle powders manufactured in Examples 1-1 to 1-4, and then capacity, life time characteristic and DSC characteristic were measured. The results were shown in the following Table 1.

As shown in the following Table 1, it was confirmed that the batteries using Examples 1-1 to 1-4 having concentration gradient showed improved capacity, life time characteristic and DSC characteristic, compared with the battery using Comparative Example not showing concentration gradient, and in particular, the life time characteristic and the DSC characteristic were improved as the thickness of the surface maintain region was increased.

TABLE 1

|  | Capacity (mAhg$^{-1}$) | Life Time Characteristic (%, 100$^{th}$) | DSC (° C.) |
| --- | --- | --- | --- |
| Example 1-1 | 193.0 | 94.5 | 277.3 |
| Example 1-2 | 191.1 | 95.2 | 280.1 |
| Example 1-3 | 188.2 | 96.1 | 287.2 |
| Example 1-4 | 184.8 | 97.3 | 294.7 |
| Comparative Example 1 | 181.3 | 93.9 | 266.3 |

<Example 2> Manufacture of Precursor and Active Material Having Constant Mn Concentration in Entire Particle and Showing Concentration Gradients of Ni and Co in Entire Particle In order to make the Mn concentration in the entire particle constant as 0.3 and concentration gradients of Co and Ni, first of all, 2.4 M metal aqueous solution, wherein nickel sulfate, cobalt sulfate and manganese sulfate are mixed at the molar ratio of 70:0:30, was used, and then the procedure of Example 1 was repeated except for continuing the reaction by using the metal aqueous solution whose concentration was changing until the concentration became 50:20:30 to obtain a precursor and an active material of Example 2-1.

The procedure of Example 2-1 was repeated except for continuing the reaction as maintaining the said molar ratio when the molar ratio of the metal aqueous solution reached 50:20:30 during the composite particle forming process for further comprising a surface maintain regions having thickness of 0.5 μm, so as to obtain a precursor and an active material of Example 2-2.

<Test Example> TEM Imaging

Approximate core part of the active material particle powder manufactured in Example 2-2 was cut with a hydrogen ion beam, and a sample for measurement was prepared. Then, TEM images were taken.

Figure 10:
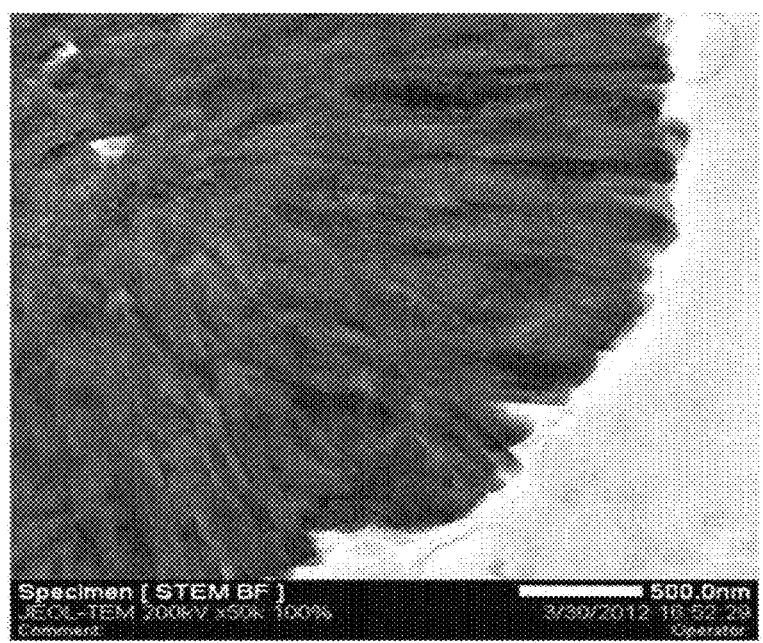
FIG. 10: a TEM image of the positive electrode active material for a lithium secondary battery manufactured in one Example of the present invention.

FIG. 10 represents a TEM image of the cross-section of the positive electrode active material powder manufactured according to Example 2-2. It was confirmed that the primary particles had orientation toward the core part even when the Mn concentration was constant as 0.3, the concentrations of Co and Ni showed gradient, and a surface maintain region was formed, and the a-axis direction length to c-axis direction length ratio was increasing.

<Test Example> Measuring Battery Characteristic

Batteries were manufactured by using the active material particle powders manufactured in Examples 2-1 to 2-2, and then capacity, life time characteristic and DSC characteristic were measured. The results were shown in the following Table 2.

As shown in the following Table 2, it was confirmed that the batteries using Examples 2-1 to 2-2 showed improved capacity, life time characteristic and DSC characteristic, and in particular, the life time characteristic and the DSC characteristic were improved as the thickness of the surface maintain region was increased.

TABLE 2

|  | Capacity (mAhg$^{-1}$) | Life Time Characteristic (%, 100$^{th}$) | DSC (° C.) |
| --- | --- | --- | --- |
| Example 2-1 | 183.9 | 96.2 | 291.8 |
| Example 2-2 | 182.3 | 97.0 | 295.3 |

<Example 3> Manufacture of Precursor and Active Material Having Constant Co Concentration in Entire Particle and Showing Concentration Gradients of Ni and Mn in Entire Particle In order to make the Co concentration in the entire particle constant as 0.1 and concentration gradients of Ni and Mn, first of all, 2.4 M metal aqueous solution, wherein nickel sulfate, cobalt sulfate and manganese sulfate are mixed at the molar ratio of 85:10:05, was used, and then the procedure of Example 1 was repeated except for continuing the reaction by using the metal aqueous solution whose concentration was changing until the concentration became 60:10:30 to obtain a positive electrode active material precursor and a positive electrode active material, thereby obtaining a positive electrode active material powder of Example 3-1.

The procedure of Example 3-1 was repeated except for continuing the reaction as maintaining the said molar ratio when the molar ratio of the metal aqueous solution reached 60:10:30 during the composite particle forming process for further comprising a surface maintain regions having thickness of 0.2 μm and 0.5 μm, respectively, so as to obtain spherical nickel-manganese-cobalt composite hydroxide precursors of Examples 3-2 and 3-3 containing the second interior having concentration gradient and a surface maintain region.

<Test Example> TEM Imaging

Figure 11:
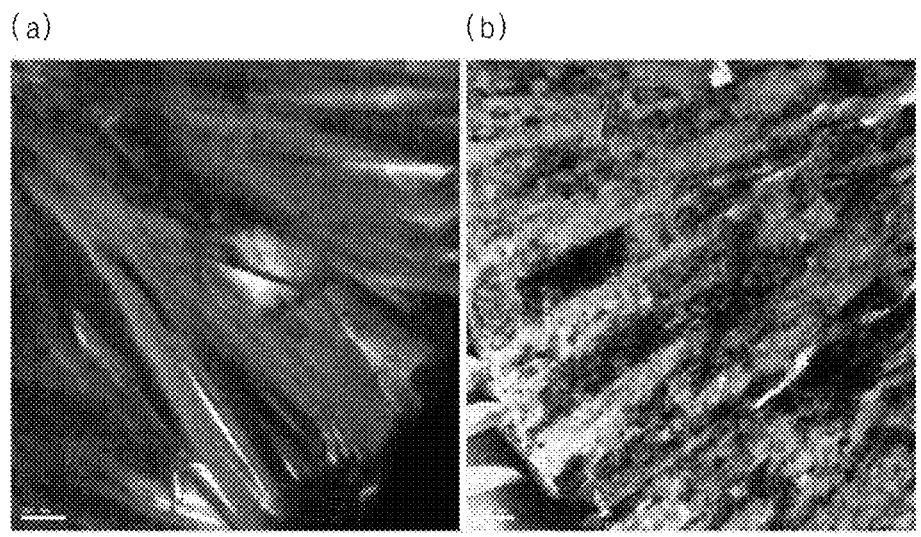
FIG. 11 to FIG. 16: TEM images of cross-sections of the positive electrode active material precursor and the positive electrode active material powder manufactured in one Example of the present invention.
Figure 12:
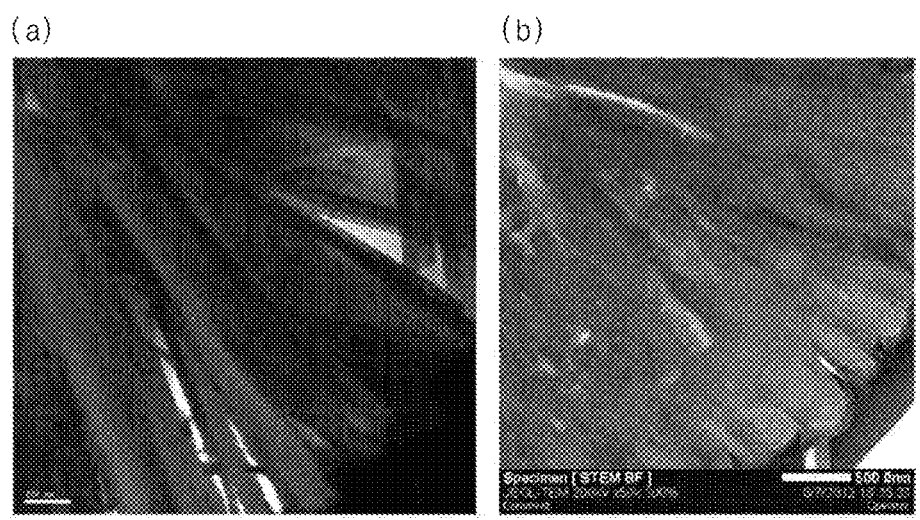

TEM images of the cross-sections of the nickel-manganese-cobalt composite hydroxide precursors and the positive electrode active material of Examples 3-2 to 3-3 were taken, and the results were shown in FIGS. 11 and 12.

FIGS. 11 and 12 represent TEM images of the precursor (a) of Example 3-2 and Example 3-3 and the positive electrode active material (b). It was confirmed that when the thickness of the surface maintain region were 0.2 μm and 0.5 μm, respectively, the a-axis direction length to c-axis direction length ratio of the primary particle was increased, and the primary particles grew with the orientation toward the core part of the secondary particle in both of the precursor and the active material.

Comparative Example 2

Figure 13:
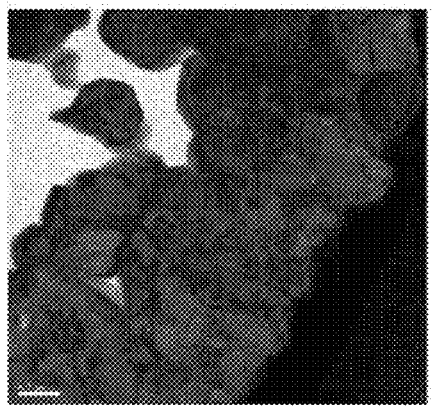
Figure 13:
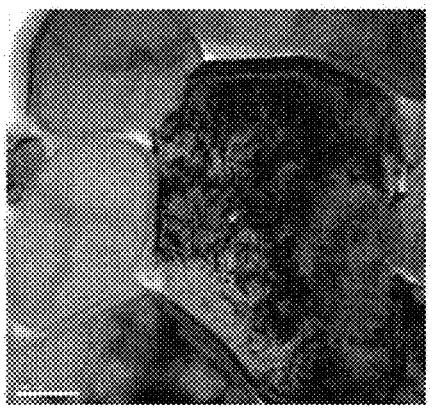

Particles having constant metal ion concentration expressed by $Li(Ni_{0.65}Co_{0.10}Mn_{0.25})O_2$ in the entire particle were manufactured, and the cross-sectional TEM image thereof was shown in FIG. 13. It was confirmed that the particle had constant a-axis direction length to c-axis direction length ratio, and did not show the orientation toward the core part of the particle.

<Test Example> Measuring Battery Characteristic

Batteries were manufactured by using the active material particle powders manufactured in Examples 3-1 to 3-3, and then capacity, life time characteristic and DSC characteristic were measured. The results were shown in the following Table 3.

As shown in the following Table 3, it was confirmed that the batteries using Examples 3-1 to 3-3 having concentration gradient showed improved capacity, life time characteristic and DSC characteristic, compared with the battery using Comparative Example 2 not showing concentration gradient, and in particular, the life time characteristic and the DSC characteristic were improved as the thickness of the surface maintain region was increased.

TABLE 3

|  | Capacity (mAhg$^{-1}$) | Life Time Characteristic (%, 100$^{th}$) | DSC (° C.) |
| --- | --- | --- | --- |
| Example 3-1 | 197.1 | 94.5 | 270.3 |
| Example 3-2 | 196.0 | 95.2 | 273.5 |
| Example 3-3 | 194.8 | 96.1 | 278.1 |
| Comparative Example 2 | 185.8 | 91.8 | 261.2 |

<Example 4> Manufacture of Precursor and Active
Material Having Constant Ni Concentration in
Entire Particle and Showing Concentration
Gradients of Co and Mn in Entire Particle In order to make the Ni concentration in the entire particle constant as 0.8 and concentration gradients of Co and Mn, first of all, nickel sulfate, cobalt sulfate and manganese sulfate were mixed at the molar ratio of 80:20:00, and then the procedure of Example 1 was repeated except for continuing the reaction by using the metal aqueous solution whose concentration was changing until the concentration became 80:01:19 to obtain a positive electrode active material powder of Example 4-1, wherein the first interior had concentration of $Li[Ni_{0.80}Co_{0.20}]O_2$ and the second interior had constant continuous concentration gradient from $Li[Ni_{0.80}Co_{0.20}]O_2$ to $Li[Ni_{0.80}Co_{0.01}Mn_{0.19}]O_2$.

The procedure of Example 4 was repeated except for continuing the reaction as maintaining the said molar ratio when the molar ratio of the metal aqueous solution reached 80:01:19 during the composite particle forming process for further comprising a surface maintain regions having thickness of 0.2 μm and 0.5 μm, respectively, so as to obtain spherical nickel-manganese-cobalt composite hydroxides of Examples 4-2 and 4-3 containing the second interior having concentration gradient and a surface maintain region.

<Test Example> TEM Imaging

Figure 14:
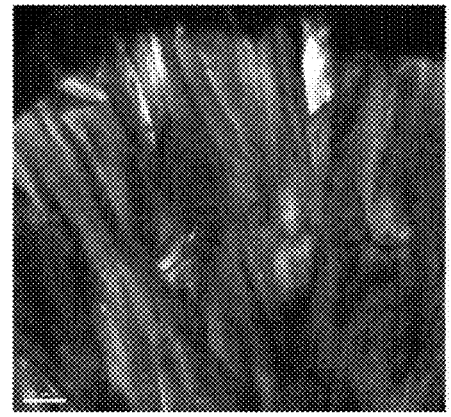
Figure 14:
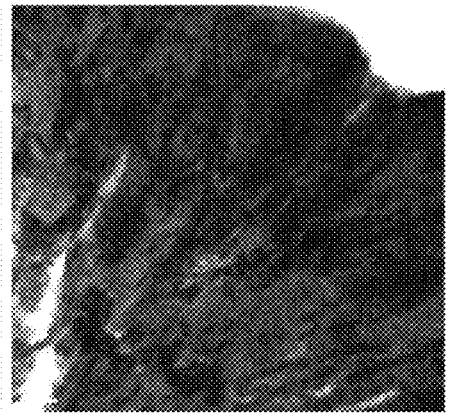

TEM images of the cross-sections of the nickel-manganese-cobalt composite hydroxide precursor and the positive electrode active material of Example 4-3 were taken, and the results were shown in FIG. 14.

FIG. 14 represents a TEM image of the precursor (a) and the positive electrode active material (b) of Example 4-3. It was confirmed that the a-axis direction length to c-axis direction length ratio of the primary particle was increased, and the primary particles grew with the orientation toward the core part of the particle in both of the precursor and the active material, wherein the Ni concentration was constant as 0.8, the Co and Mn concentrations showed gradient, and a surface maintain region was contained thereto.

Comparative Example 3

Particles having constant metal ion concentration expressed by $Li(Ni_{0.65}Co_{0.10}Mn_{0.25})O_2$ in the entire particle were manufactured.

<Example 5> Manufacture of Precursor and Active
Material Having Constant Ni Concentration in
Entire Particle and Showing Concentration
Gradients of Co and Mn in Entire Particle In order to make the Ni concentration in the entire particle constant as 0.75 and concentration gradients of Co and Mn as Example 5-1, first of all, nickel sulfate, cobalt sulfate and manganese sulfate were mixed at the molar ratio of 75:25:00, and then the procedure of Example 1 was repeated except for continuing the reaction by using the metal aqueous solution whose concentration was changing until the concentration became 75:02:23 to obtain a positive electrode active material powder, wherein the first interior had concentration of $Li[Ni_{0.75}Co_{0.25}]O_2$ and the second interior had constant continuous concentration gradient from $Li[Ni_{0.75}Co_{0.25}]O_2$ to $Li[Ni_{0.75}Co_{0.02}Mn_{0.23}]O_2$.

The procedure of Example 4 was repeated except for continuing the reaction as maintaining the said molar ratio when the molar ratio of the metal aqueous solution reached 75:02:23 during the composite particle forming process for further comprising a surface maintain regions having thickness of 0.2 μm and 0.5 μm, respectively, so as to obtain spherical nickel-manganese-cobalt composite hydroxides of Examples 5-2 and 5-3 containing the second interior having concentration gradient and a surface maintain region.

<Example 6> Manufacture of Precursor and Active
Material Having Constant Ni Concentration in
Entire Particle and Showing Concentration
Gradients of Co and Mn in Entire Particle In order to make the Ni concentration in the entire particle constant as 0.70 and concentration gradients of Co and Mn as Example 6, first of all, nickel sulfate, cobalt sulfate and manganese sulfate were mixed at the molar ratio of 70:30:00, and then the procedure of Example 1 was repeated except for continuing the reaction by using the metal aqueous solution whose concentration was changing until the concentration became 70:02:28 to obtain a positive electrode active material powder, wherein the first interior had concentration of $Li[Ni_{0.70}Co_{0.30}]O_2$ and the second interior had constant continuous concentration gradient up to $Li[Ni_{0.70}Co_{0.02}Mn_{0.28}]O_2$.

The procedure of Example 4 was repeated except for continuing the reaction as maintaining the said molar ratio when the molar ratio of the metal aqueous solution reached 70:02:28 during the composite particle forming process for further comprising a surface maintain regions having thickness of 0.2 μm and 0.5 μm, respectively, so as to obtain spherical nickel-manganese-cobalt composite hydroxides of Examples 6-2 and 6-3 containing the second interior having concentration gradient and a surface maintain region.

<Example 7> Manufacture of Precursor and Active
Material Having Constant Ni Concentration in
Entire Particle and Showing Concentration
Gradients of Co and Mn in Entire Particle In order to make the Ni concentration in the entire particle constant as 0.65 and concentration gradients of Co and Mn as Example 7, first of all, nickel sulfate, cobalt sulfate and manganese sulfate were mixed at the molar ratio of 65:35:00, and then the procedure of Example 1 was repeated except for continuing the reaction by using the metal aqueous solution whose concentration was changing until the concentration became 65:02:33 to obtain a positive electrode active material powder, wherein the first interior had concentration of $Li[Ni_{0.65}Co_{0.35}]O_2$ and the second interior had constant continuous concentration gradient up to $Li[Ni_{0.65}Co_{0.02}Mn_{0.33}]O_2$.

The procedure of Example 4 was repeated except for continuing the reaction as maintaining the said molar ratio when the molar ratio of the metal aqueous solution reached 65:02:33 during the composite particle forming process for further comprising a surface maintain regions having thickness of 0.2 μm and 0.5 μm, respectively, so as to obtain spherical nickel-manganese-cobalt composite hydroxides of Examples 7-2 and 7-3 containing the second interior having concentration gradient and a surface maintain region.

Comparative Example 4

Particles having constant metal ion concentration expressed by $Li(Ni_{0.62}Co_{0.15}Mn_{0.23})O_2$ in the entire particle were manufactured.

<Test Example> Measuring Battery Characteristic

Batteries were manufactured by using the active material particle powders, which were manufactured in Examples 4 to 7 and had constant Ni concentration and concentration gradients of Co and Mn in the entire particle, and then capacity, life time characteristic and DSC characteristic were measured. The results were shown in the following Table 4.

As shown in the following Table 4, it was confirmed that the batteries using Examples 4 to 7 having concentration gradient showed improved capacity, life time characteristic and DSC characteristic, compared with the battery using Comparative Example 4 not showing concentration gradient, and in particular, the life time characteristic and the DSC characteristic were improved as the thickness of the surface maintain region was increased.

TABLE 4

| | Capacity (mAhg$^{-1}$) | Life Time Characteristic (%, 100$^{th}$) | DSC (° C.) |
|---|---|---|---|
| Example 4 | 211.3 | 86.1 | 244.7 |
| Example 4-2 | 210.8 | 86.8 | 245.5 |
| Example 4-3 | 209.7 | 87.2 | 247.1 |
| Example 5 | 205.6 | 91.0 | 256.5 |
| Example 5-2 | 204.7 | 91.7 | 258.8 |
| Example 5-3 | 203.9 | 92.5 | 260.1 |
| Example 6 | 200.8 | 92.9 | 266.9 |
| Example 6-2 | 199.8 | 93.5 | 268.2 |
| Example 6-3 | 198.5 | 94.2 | 270.0 |
| Example 7 | 195.7 | 94.3 | 275.1 |
| Example 7-2 | 195.2 | 94.9 | 275.9 |
| Example 7-3 | 194.5 | 95.7 | 277.2 |
| Comparative Example 4 | 200.9 | 53.2 | 229.9 |

<Example 8> Manufacture of Precursor and Active Material Having Constant Ni Concentration in Entire Particle and Showing Concentration Gradients of Co and Mn in Entire Particle In order to make the Ni concentration in the entire particle constant as 0.9 and concentration gradients of Co and Mn as Example 8, first of all, nickel sulfate, cobalt sulfate and manganese sulfate were mixed at the molar ratio of 90:10:00, and then the procedure of Example 1 was repeated except for continuing the reaction by using the metal aqueous solution whose concentration was changing until the concentration became 90:01:09 to obtain a positive electrode active material powder, wherein the first interior had concentration of $Li[Ni_{0.90}Co_{0.10}]O_2$ and the second interior had constant continuous concentration gradient up to $Li[Ni_{0.90}Co_{0.01}Mn_{0.09}]O_2$.

<Example 9> Manufacture of Precursor and Active Material Having Constant Ni Concentration in Entire Particle and Showing Concentration Gradients of Co and Mn in Entire Particle In order to make the Ni concentration in the entire particle constant as 0.6 and concentration gradients of Co and Mn as Example 9, first of all, nickel sulfate, cobalt sulfate and manganese sulfate were mixed at the molar ratio of 60:40:00, and then the procedure of Example 1 was repeated except for continuing the reaction by using the metal aqueous solution whose concentration was changing until the concentration became 60:02:38 to obtain a positive electrode active material powder of Example 9-1, wherein the first interior had concentration of $Li[Ni_{0.60}Co_{0.40}]O_2$ and the second interior had constant continuous concentration gradient up to $Li[Ni_{0.90}Co_{0.02}Mn_{0.38}]O_2$.

Further, first of all, nickel sulfate, cobalt sulfate and manganese sulfate were mixed at the molar ratio of 60:20:20, and then the procedure of Example 1 was repeated except for continuing the reaction by using the metal aqueous solution whose concentration was changing until the concentration became 60:02:38 to obtain a positive electrode active material powder of Example 9-2, wherein the first interior had concentration of $Li[Ni_{0.60}Co_{0.20}Mn_{0.20}]O_2$ and the second interior had constant continuous concentration gradient up to $Li[Ni_{0.60}Co_{0.02}Mn_{0.38}]O_2$.

<Example 10> Manufacture of Precursor and Active Material Having Constant Ni Concentration in Entire Particle and Showing Concentration Gradients of Co and Mn in Entire Particle In order to make the Ni concentration in the entire particle constant as 0.5 and concentration gradients of Co and Mn as Example 10, first of all, nickel sulfate, cobalt sulfate and manganese sulfate were mixed at the molar ratio of 50:50:00, and then the procedure of Example 1 was repeated except for continuing the reaction by using the metal aqueous solution whose concentration was changing until the concentration became 50:20:30 to obtain a positive electrode active material powder of Example 10-1, wherein the first interior had concentration of $Li[Ni_{0.50}Co_{0.50}]O_2$ and the second interior had constant continuous concentration gradient up to $Li[Ni_{0.50}Co_{0.2}Mn_{0.3}]O_2$.

Further, first of all, nickel sulfate, cobalt sulfate and manganese sulfate were mixed at the molar ratio of 50:30:20, and then the procedure of Example 1 was repeated except for continuing the reaction by using the metal aqueous solution whose concentration was changing until the concentration became 50:20:30 to obtain a positive electrode active material powder of Example 10-2, wherein the first interior had concentration of $Li[Ni_{0.50}Co_{0.30}Mn_{0.20}]O_2$ and the second interior had constant continuous concentration gradient up to $Li[Ni_{0.50}Co_{0.20}Mn_{0.30}]O_2$.

Further, first of all, nickel sulfate, cobalt sulfate and manganese sulfate were mixed at the molar ratio of 50:20:30, and then the procedure of Example 1 was repeated except for continuing the reaction by using the metal aqueous solution whose concentration was changing until the concentration became 50:05:45 to obtain a positive electrode active material powder of Example 10-3, wherein the first interior had concentration of $Li[Ni_{0.50}Co_{0.20}Mn_{0.30}]O_2$ and the second interior had constant continuous concentration gradient up to $Li[Ni_{0.50}Co_{0.05}Mn_{0.45}]O_2$.

<Test Example> Measuring Battery Characteristic

Batteries were manufactured by using the active material particle powders, which were manufactured in Examples 8 to 10 and had constant Ni concentration and concentration gradients of Co and Mn in the entire particle, and then capacity, life time characteristic and DSC characteristic were measured. The results were shown in the following Table 5.

As shown in the following Table 5, it was confirmed that the batteries using the active material particle powders manufactured in Examples 8 to 10 having concentration gradient showed improved life time characteristic and DSC characteristic.

TABLE 5

|  | Capacity (mAhg$^{-1}$) | Life Time Characteristic (%, 100$^{th}$) | DSC (° C.) | Tap density |
|---|---|---|---|---|
| Example 8 | 215.4 | 87.6 | 241.2 | 2.39 |
| Example 9 | 189.8 | 93.6 | 279.2 | 2.48 |
| Example 9-2 | 188.2 | 94.8 | 282.2 | 2.53 |
| Example 10 | 184.2 | 95.1 | 291.2 | 2.49 |
| Example 10-2 | 182.7 | 95.9 | 295.1 | 2.51 |
| Example 10-3 | 178.5 | 93.2 | 302.5 | 2.58 |

<Example 11> Case of Showing Concentration Gradients of Co, Ni and Mn in Entire Particle In order to make the concentration gradients of Co, Ni and Mn, first of all, nickel sulfate, cobalt sulfate and manganese sulfate were mixed at the molar ratio of 80:05:15, and then the procedure of Example 1 was repeated except for using the metal aqueous solution whose concentration was changing until the molar ratio became as shown in the following Table to obtain positive electrode active material powders having constant continuous concentration gradients of Co, Ni and Mn.

TABLE 6

|  | Ni:Co:Mn |
|---|---|
| Example 11-1 | 55:15:30 |
| Example 11-2 | 55:20:25 |
| Example 11-3 | 60:15:25 |
| Example 11-4 | 60:10:30 |

Figure 15:
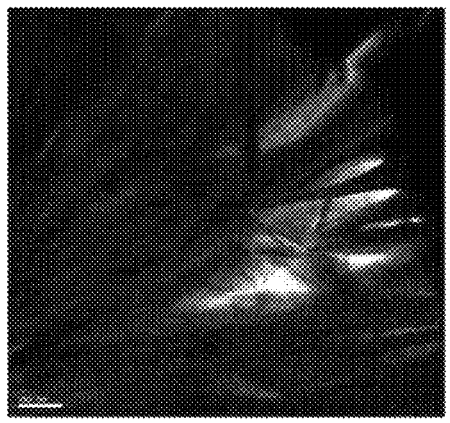
Figure 15:
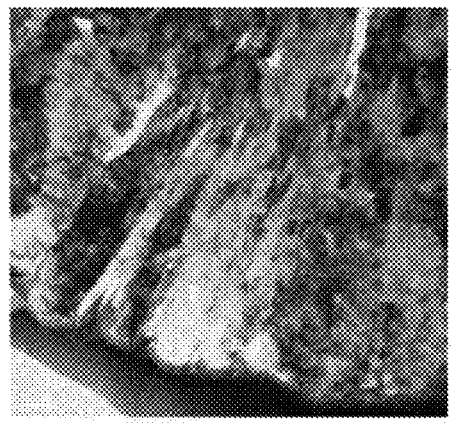

Samples of the nickel-manganese-cobalt composite hydroxide and the positive electrode active material manufactured in Example 11-4 were manufactured, and then TEM images were taken. The result was shown in FIG. 15.

Comparative Example 5

Particles having constant metal ion concentration expressed by Li(Ni$_{0.62}$Co$_{0.13}$Mn$_{0.25}$)O$_2$ in the entire particle were manufactured.

<Test Example> Measuring Battery Characteristic

Batteries were manufactured by using the active material particle powders manufactured in Examples 11 to 11-4, and then capacity, life time characteristic and DSC characteristic were measured. The results were shown in the following Table 7.

As shown in the following Table 7, it was confirmed that the batteries using Examples 11 to 11-4 having concentration gradient showed improved capacity, life time characteristic and DSC characteristic, compared with the battery using Comparative Example 5 not showing concentration gradient, and in particular, the life time characteristic and the DSC characteristic were improved as the thickness of the surface maintain region was increased.

TABLE 7

|  | Capacity (mAhg$^{-1}$) | Life Time Characteristic (%, 100$^{th}$) | DSC (° C.) |
|---|---|---|---|
| Example 11 | 191.2 | 94.7 | 275.9 |
| Example 11-2 | 192.8 | 94.2 | 270.7 |
| Example 11-3 | 195.8 | 93.3 | 269.9 |
| Example 11-4 | 196.2 | 94.4 | 272.5 |
| Comparative Example 5 | 183.6 | 92.8 | 264.1 |

<Example 12> Case of Showing Concentration Gradients of Co, Ni and Mn in Entire Particle In order to make the concentration gradients of Co, Ni and Mn, first of all, nickel sulfate, cobalt sulfate and manganese sulfate were mixed as shown in the following Table 8, and then the procedure of Example 1 was repeated except for using the metal aqueous solution whose concentration was changing until the concentration became 55:15:30 to obtain nickel-manganese-cobalt composite hydroxides and positive electrode active material particles having constant continuous concentration gradients of Co, Ni and Mn.

TABLE 8

|  | Ni:Co:Mn |
|---|---|
| Example 12-1 | 80:00:20 |
| Example 12-2 | 80:10:10 |
| Example 12-3 | 80:15:05 |
| Example 12-4 | 80:20:00 |

Figure 16:
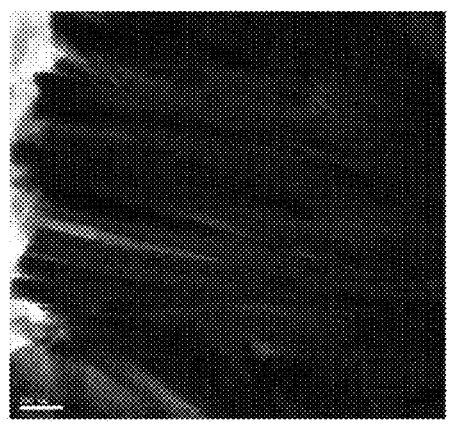
Figure 16:
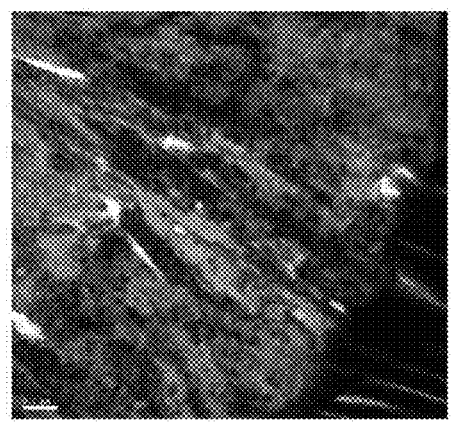

Samples of the nickel-manganese-cobalt composite hydroxide and the positive electrode active material manufactured in Example 12-1 were manufactured, and then TEM images were taken. The result was shown in FIG. 16.

Comparative Example 6

Particles having constant metal ion concentration expressed by Li(Ni$_{0.62}$Co$_{0.15}$Mn$_{0.23}$)O$_2$ in the entire particle were manufactured.

<Test Example> Measuring Battery Characteristic

Batteries were manufactured by using the active material particle powders manufactured in Examples 12 to 12-4, and then capacity, life time characteristic and DSC characteristic were measured. The results were shown in the following Table 9.

As shown in the following Table 9, it was confirmed that the batteries using Examples 12-1 to 12-4 having concentration gradient showed improved capacity, life time characteristic and DSC characteristic, compared with the battery using Comparative Example 6 not showing concentration gradient, and in particular, the life time characteristic and the DSC characteristic were improved as the thickness of the surface maintain region was increased.

TABLE 9

| | Capacity (mAhg$^{-1}$) | Life Time Characteristic (%, 100$^{th}$) | DSC (° C.) |
|---|---|---|---|
| Example 12-1 | 190.8 | 95.1 | 277.9 |
| Example 12-2 | 191.4 | 95.0 | 274.7 |
| Example 12-3 | 191.5 | 94.7 | 272.9 |
| Example 12-4 | 191.9 | 94.5 | 271.8 |
| Comparative Example 6 | 184.1 | 92.0 | 260.8 |

<Example 12> Case of Showing Concentration Gradients of Co, Ni and Mn in Entire Particle In order to make the outside composition constant as 63:12:25 but concentration gradients of Co, Ni and Mn in the entire particle, first of all, nickel sulfate, cobalt sulfate and manganese sulfate were mixed at the molar ratio shown in the following Table 10, and then the procedure of Example 1 was repeated except for using the metal aqueous solution whose concentration was changing until the concentration became 63:12:25 to obtain positive electrode active material particles, so as to obtain positive electrode active material powder, wherein the concentrations of Co, Ni and Mn showed gradient in the entire particle.

TABLE 10

| | Ni:CO:Mn |
|---|---|
| Example 13-1 | 75:00:25 |
| Example 13-2 | 80:00:20 |
| Example 13-3 | 85:00:15 |
| Example 13-4 | 75:10:15 |
| Example 13-5 | 80:10:10 |
| Example 13-6 | 85:10:05 |

Figure 17:
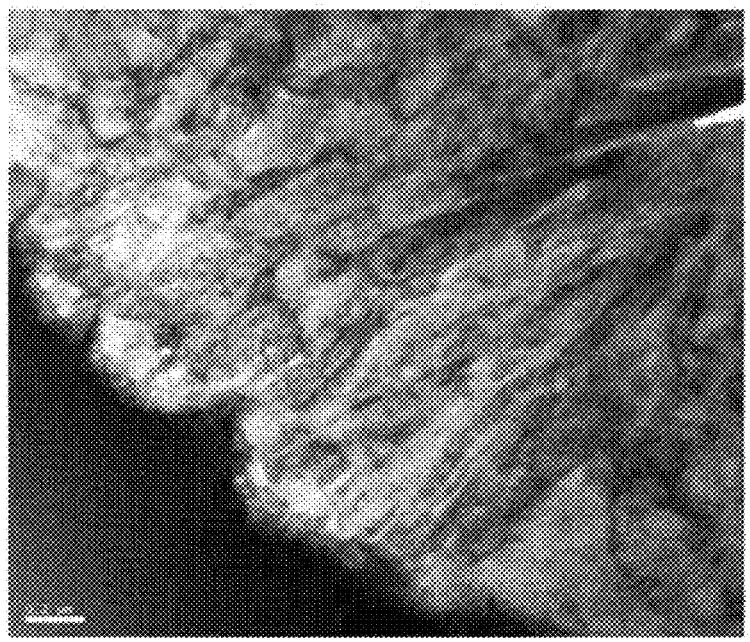
FIG. 17: a TEM image of the positive electrode active material for a lithium secondary battery manufactured in one Example of the present invention.

A sample of the nickel-manganese-cobalt composite hydroxide manufactured in Example 13-6 was manufactured, and then a TEM image was taken. The result was shown in FIG. 17.

Comparative Example 7

Particles having constant metal ion concentration expressed by Li(Ni$_{0.68}$Co$_{0.12}$Mn$_{0.20}$)O$_2$ in the entire particle were manufactured.

<Test Example> Measuring Battery Characteristic

Batteries were manufactured by using the active material particle powders manufactured in Examples 13-1 to 13-6, and then capacity, life time characteristic and DSC characteristic were measured. The results were shown in the following Table 11.

As shown in the following Table 11, it was confirmed that the batteries using Examples 13-1 to 13-6 having concentration gradient showed improved capacity, life time characteristic and DSC characteristic, compared with the battery using Comparative Example 7 not showing concentration gradient, and in particular, the life time characteristic and the DSC characteristic were improved as the thickness of the surface maintain region was increased.

TABLE 11

| | Capacity (mAhg$^{-1}$) | Life Time Characteristic (%, 100$^{th}$) | DSC (° C.) |
|---|---|---|---|
| Example 13-1 | 196.9 | 94.6 | 271.2 |
| Example 13-2 | 197.5 | 94.0 | 269.9 |
| Example 13-3 | 198.2 | 93.2 | 267.4 |
| Example 13-4 | 197.1 | 94.2 | 270.0 |
| Example 13-5 | 198.1 | 93.7 | 268.9 |
| Example 13-6 | 198.9 | 92.8 | 266.9 |
| Comparative Example 7 | 188.3 | 90.2 | 257.5 |

Example 14

In order to manufacture a positive electrode active material precursor and a positive electrode active material continuously comprising the first interior, wherein the Co composition was constant, and the Ni and Mn compositions showed concentration gradient, and the second interior, wherein the Mn composition was constant, and the Co and Ni compositions showed concentration gradient, the procedure of Example 1 was repeated except for using a metal aqueous solution whose concentration was changing until the concentration became 55:20:25 while mixing a mixture of nickel sulfate, cobalt sulfate and manganese sulfate at the composition of 65:10:25 to a mixture of nickel sulfate, cobalt sulfate and manganese sulfate at the composition of 75:10:15 to manufacture a positive electrode active material particle, so as to obtain a positive electrode active material precursor positive electrode active material of Example 14-1, wherein in the first interior, the Co composition was constant, and the Ni and Mn compositions showed concentration gradient, and in the second interior, wherein the Mn composition was constant, and the Co and Ni compositions showed concentration gradient.

The procedure of Example 4 was repeated except for continuing the reaction as maintaining the said molar ratio when the molar ratio of the metal aqueous solution reached 55:20:25 during the particle forming process for further comprising surface maintain regions having thickness of 0.2 μm and 0.5 μm, respectively, so as to obtain spherical nickel-manganese-cobalt composite hydroxides of Examples 14-2 and 14-3 containing the second interior having concentration gradient and a surface maintain region.

<Test Example> Measuring Battery Characteristic

Batteries were manufactured by using the active material particle powders manufactured in Examples 14-1 to 14-3, and then capacity, life time characteristic and DSC characteristic were measured. The results were shown in the following Table 12.

As shown in the following Table 12, it was confirmed that the batteries using Examples 14-1 to 14-3 having concentration gradient showed improved capacity, life time characteristic and DSC characteristic, compared with the battery using Comparative Example 7 not showing concentration gradient, and in particular, the life time characteristic and the DSC characteristic were improved as the thickness of the surface maintain region was increased.

TABLE 12

| | Capacity (mAhg$^{-1}$) | Life Time Characteristic (%, 100$^{th}$) | DSC (° C.) |
|---|---|---|---|
| Example 14-1 | 193.1 | 94.2 | 275.7 |
| Example 14-2 | 191.0 | 95.0 | 278.8 |
| Example 14-3 | 189.5 | 95.9 | 285.9 |
| Comparative Example 7 | 181.3 | 93.9 | 266.3 |

<Example 15> Manufacturing Core-Gradient Shell Precursor and Active Material

A positive electrode active material precursor and a positive electrode active material of Example 15-1, wherein the nickel:manganese:cobalt composition was constant as 90:05:05 in the first interior, and the composition of Co, Ni and Mn showed concentration gradient from 90:05:05 to 0.33:0.33:0.33 in the second interior, were manufactured.

A positive electrode active material precursor and a positive electrode active material of Example 15-2, wherein the composition was constant as 90:05:05 in the first interior, and the composition of Co, Ni and Mn showed concentration gradient from 70:10:20 to 60:10:30 in the second interior, were manufactured.

<Test Example> TEM Imaging

Figure 18:
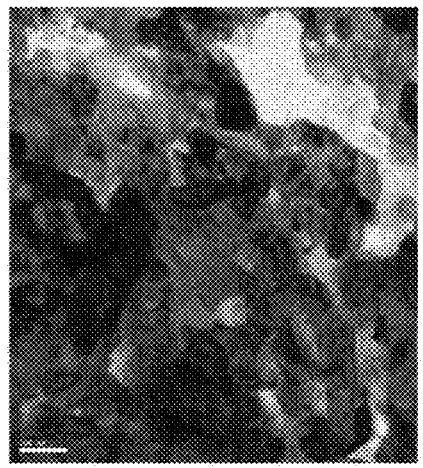
FIG. 18 and FIG. 19: TEM images of the core part and the shell part of the positive electrode active material for a lithium secondary battery.
Figure 18:
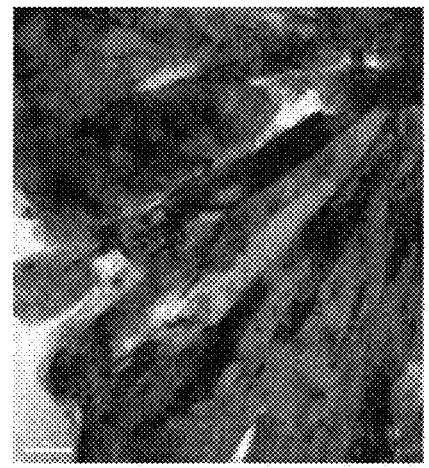
Figure 19:
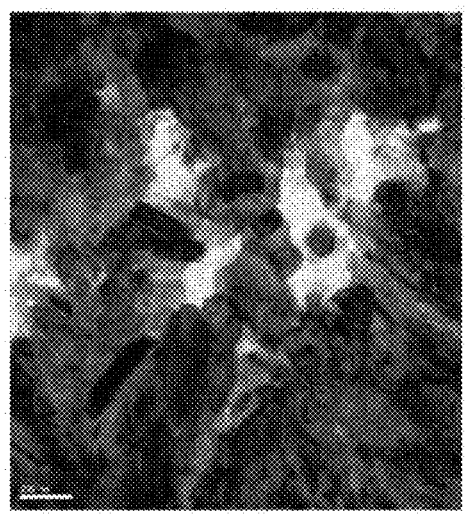
Figure 19:
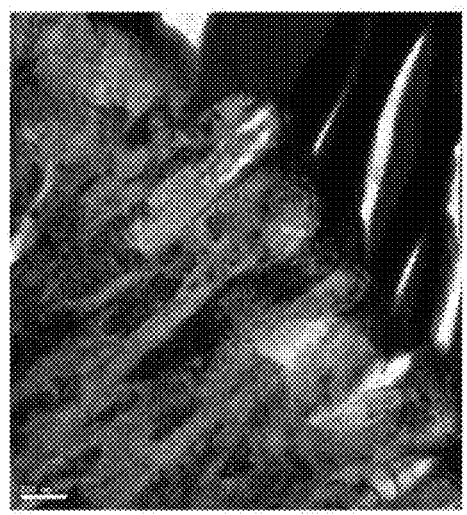

TEM images of the cross-sections of the nickel-manganese-cobalt composite hydroxide precursors and the positive electrode active material of Examples 15-1 and 15-2 were taken, and the results were shown in FIGS. 18 and 19, respectively.

FIGS. 18 and 19 represent TEM images of the core part (a) having constant concentration and the shell part (b) showing concentration gradient. In FIGS. 18 and 19, it was confirmed that the core part having constant concentration was in the form of a circle, but the a-axis direction length to c-axis direction length ratio of the primary particle was increased in the shell part showing concentration gradient.

<Example 16> Manufacturing Core-Shell Precursor and Active Material

Positive electrode active material precursors and positive electrode active materials having a core-shell structure, wherein the composition of nickel:manganese:cobalt at the core part and the shell part were as shown in the following Table 13, were manufactured.

TABLE 13

| | Core Composition | Shell Composition | Shell Thickness |
|---|---|---|---|
| Example 16-1 | 90:05:05 | 50:20:30 | 0.2 μm |
| Example 16-2 | 80:10:10 | 50:20:30 | 0.2 μm |
| Example 16-3 | 70:10:20 | 50:20:30 | 0.2 μm |
| Example 16-4 | 70:10:20 | 40:20:40 | 0.2 μm |
| Example 16-5 | 60:20:20 | 50:20:30 | 0.2 μm |
| Example 16-6 | 70:10:20 | 50:20:30 | 0.5 μm |
| Example 16-7 | 70:10:20 | 50:20:30 | 1.0 μm |
| Example 16-8 | 70:10:20 | 50:20:30 | 1.5 μm |
| Example 16-9 | 70:10:20 | 50:20:30 | 2.0 μm |
| Example 16-10 | 70:10:20 | 50:20:30 | 2.5 μm |

Batteries were manufactured by using the manufactured active material particle powders, and then capacity, life time characteristic and DSC characteristic were measured. The results were shown in the following Table 14.

TABLE 14

| | Capacity (mAhg$^{-1}$) | Life Time Characteristic (%, 100$^{th}$) | DSC (° C.) | Tap Density |
|---|---|---|---|---|
| Example 16-1 | 191.4 | 92.7 | 269.7 | 2.45 |
| Example 16-2 | 186.7 | 94.1 | 273.2 | 2.44 |
| Example 16-3 | 181.9 | 95.5 | 275.5 | 2.44 |
| Example 16-4 | 182.8 | 94.9 | 272.5 | 2.46 |
| Example 16-5 | 177.9 | 96.5 | 279.8 | 2.45 |
| Example 16-6 | 185.7 | 93.9 | 271.8 | 2.43 |
| Example 16-7 | 181.9 | 95.5 | 275.2 | 2.44 |
| Example 16-8 | 179.4 | 96.0 | 279.8 | 2.44 |
| Example 16-9 | 176.2 | 97.1 | 284.6 | 2.46 |
| Example 16-10 | 172.1 | 97.5 | 288.4 | 2.45 |

<Test Example> Measuring X-Ray Photoelectron Spectroscopy

In order to measure oxidation number of the active material particle manufactured in Example 1-1 to the direction of the particle radius, X-ray photoelectron spectroscopy was measured. The result was shown in FIG. 20.

Figure 20:
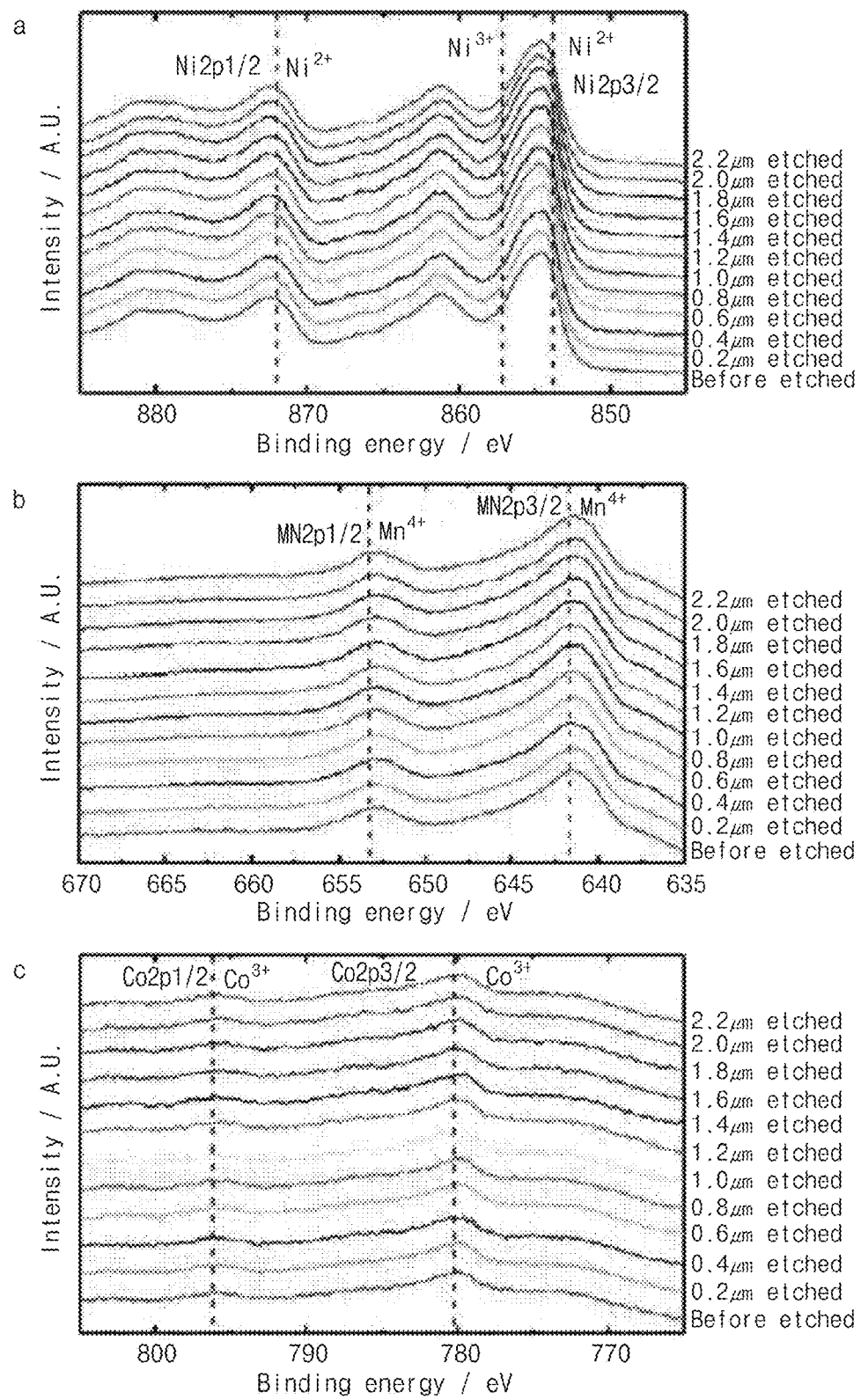
FIG. 20: a result of measuring XPS of the positive electrode active material for a lithium secondary battery manufactured in one Example of the present invention.

As shown in FIG. 20, the active material particle manufactured in Example of the present invention was determined that Ni oxidation number from the surface to the 2 ηm depth was +2 or more. Accordingly, it was confirmed that the oxidation numbers +2 and +3 were mixed, and the oxidation numbers of Mn and Co were constant.

In the positive electrode active material precursor for a lithium secondary battery of the present invention and a positive electrode active material manufactured by using thereof, the a-axis direction length to c-axis direction length ratio is changed primary particle from the core part to the shell part in the interior of the secondary particle, and the a-axis orientation of the primary particle is headed to the core part of the positive electrode active material as a secondary particle, and the particles are adjoining each other and grow to a fixed route. Accordingly, it has effects that insertion and secession of a lithium ion may become easier, and high capacity can be obtained by reduced electric resistance between particles.

Figure 21:
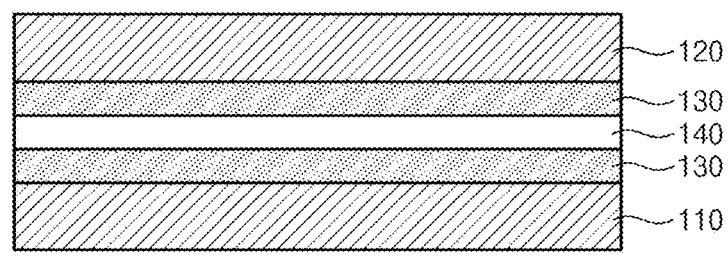
FIG. 21: a secondary battery including the positive electrode active material according to the present invention.

FIG. 21 is a drawing describing a secondary battery including the positive electrode active material according to the present invention. As shown in FIG. 21, a secondary battery according to the present invention may include a positive electrode 110, a negative electrode 210 facing the positive electrode 110, a membrane between the positive electrode 110 and the negative electrode 120, and an electrolyte 130 filled between the positive electrode 110 and the negative electrode 120.

The negative electrode 120 may include a negative electrode active material. For example, the negative electrode active material may include at least one of a carbon such as graphite or hard carbon, a metal such as Li, Na, Mg, Al, Si, In, Ti, Pb, Ga, Ge, Sn, Bi, Sb or an alloy thereof, silicon, silicon oxide, and Ti based oxide such as $Li_4Ti_5O_{12}$.

The membrane 140 may include at least one microporous film of polyolefin based resin, fluorine based resin, polyester based resin, polyacrylonitrile resin or cellulose material, and the microporous film coated by inorganic material such as ceramic. For example, the polyolefin based resin may include polyethylene, polypropylene or etc., the fluorine based resin may include polyvinylidenefluoride, polytetrafluoroethylene or etc., the polyester based resin may include polyethylene terephthalate, polybutylene terephthalate or etc.

The electrolyte 130 may be impregnated in the membrane 140, the positive electrode 110 and/or the negative electrode 120. The electrolyte 130 may be gel polymer type electrolyte or liquid electrolyte. For example, the electrolyte 130 may be formed of adding a co-solvent including at least one of dimethyl carbonate (DC), ethyl methyl carbonate (EMC) and etc. into a principle solvent including at least one of ethylene carbonate (EC) and propylene carbonate (PC), and dissolving a lithium salt therein. For example, the lithium salt may be at least one selected from lithium hexafluorophosphate ($LiPF_6$), lithium perchlorate ($LiClO_4$), lithium tetrafluoroborate ($LiBF_4$), lithium hexafluoroacetate ($LiAsF_6$), lithium bis-oxalatoborate (LiBOB), lithium trifluoromethanesulfonate ($LiCF_3SO_3$) and lithium tri(fluoromethanesulfonyl)imide ($LiCF_3SO_3$)

Figure 22:
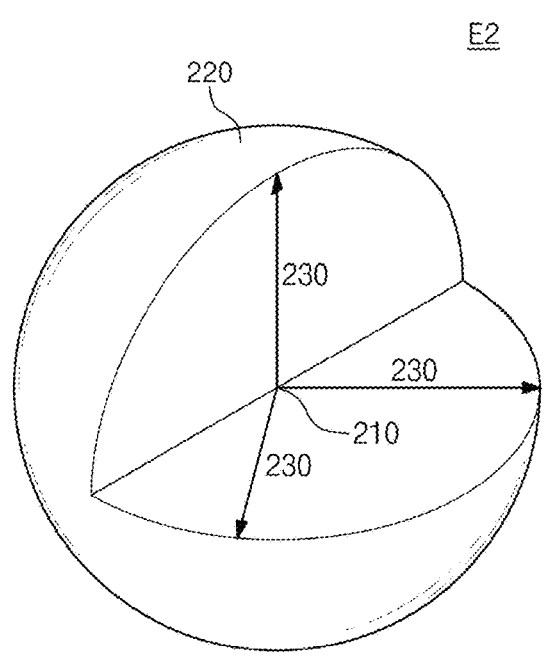
FIG. 22: a secondary particle of the positive electrode active material according to the present invention.
Figure 23:
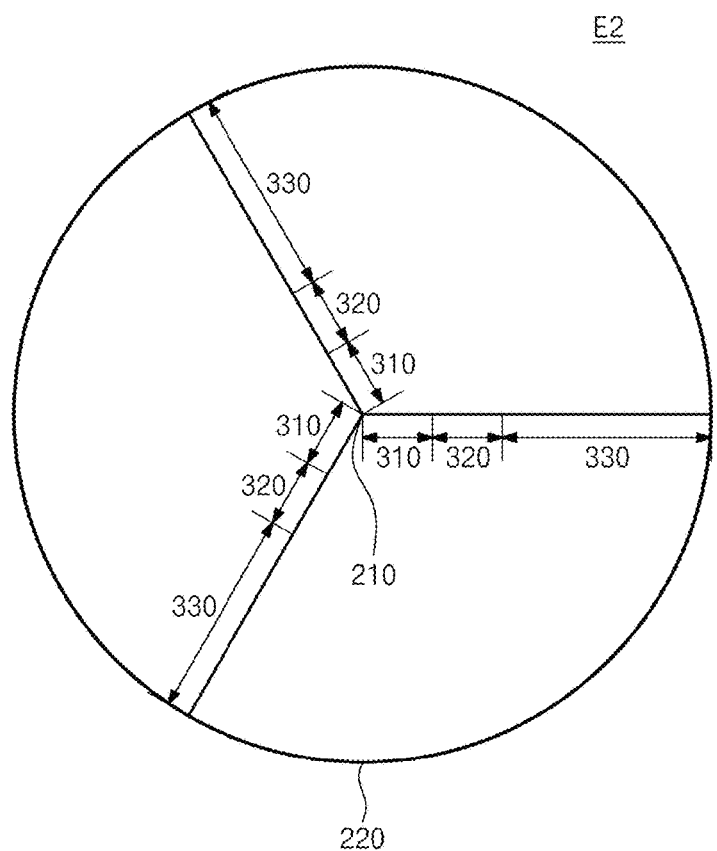
FIG. 23: a cross-section of secondary particle of the positive electrode active material in FIG. 22.
Figure 24:
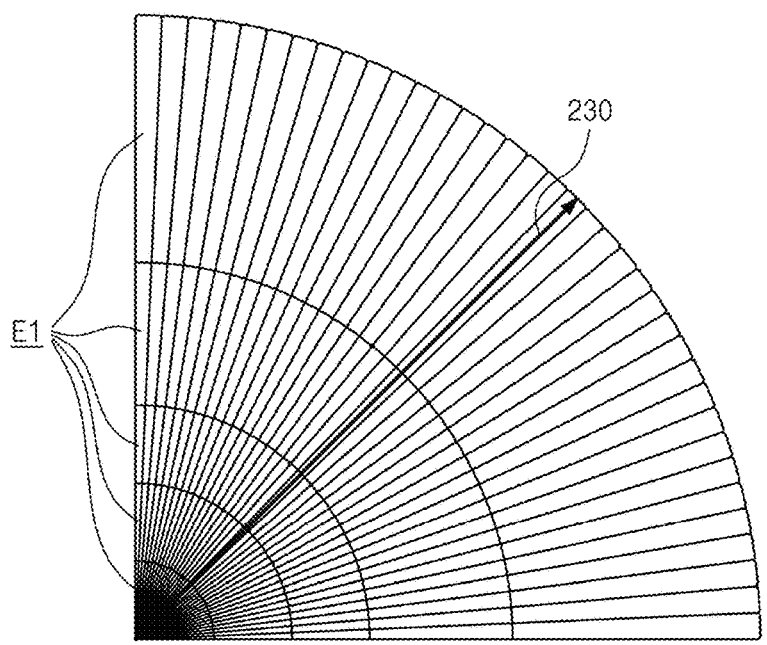
FIG. 24: a primary particle of the positive electrode active material according to the present invention.
Figure 25A:
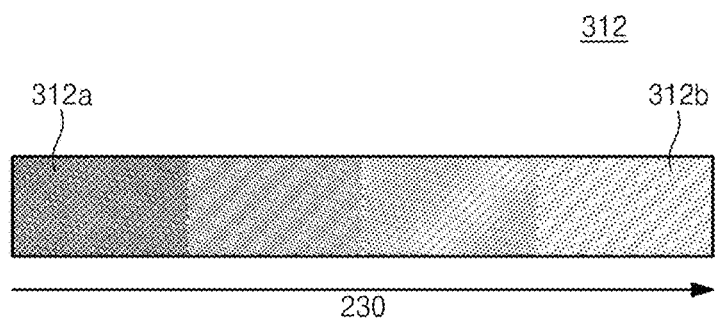
FIG. 25A: a seed element in the primary particle of the positive electrode active material according to the present invention.
Figure 25B:
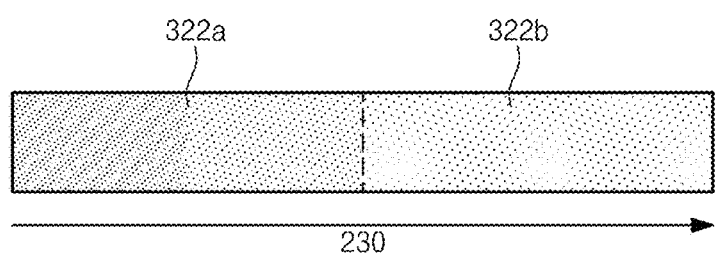
FIG. 25B: an intermediate element in the primary particle of the positive electrode active material according to the present invention.
Figure 25C:
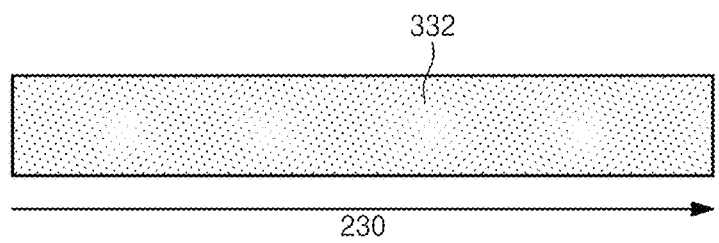
FIG. 25C: a maintain element in the primary particle of the positive electrode active material according to the present invention.

The positive electrode 110 may include a positive electrode active material. The positive electrode active material may include a primary particle and a secondary particle wherein the primary particle includes a seed element, an intermediate element and a maintain element, and the secondary particle is formed by gathering at least one of the primary particle. The positive electrode active material will be described below with reference to exemplary embodiments FIG. 22 is a drawing describing the secondary particle of the positive electrode active material according to the present invention, and FIG. 23 is a drawing describing a cross section of the secondary particle of the positive electrode active material shown in FIG. 22. FIG. 24 is a drawing describing the primary particle of the positive electrode active material according to the present invention, FIG. 25a is a drawing describing a seed element contained in the primary particle of the positive electrode active material according to the present invention, FIG. 25b is a drawing describing an intermediate element contained in the primary particle of the positive electrode active material according to the present invention and FIG. 25c is a drawing describing a maintain element contained in the primary particle of the positive electrode active material according to the present invention. As shown in FIGS. 22 through 24, and 25a through 25c, the positive electrode active material according to the present invention may include a primary particle E1 and a secondary particle E2 formed by gathering at least one of the primary particle E1.

The secondary particle E2 may include a core part 210 and a shell part 220. The core part 210 may include a core region of the secondary particle E2 and/or a portion of the secondary particle interior. The shell part 220 may be an exterior surface of the secondary particle E2.

Although sphere shaped secondary particle E2 was illustrated in FIGS. 2 and 3, the secondary particle E2 should not be limited to the drawing and cross-section thereof may have elliptic shape.

The secondary particle E2 may have a seed region 310, an intermediate region 320 and a maintain region 330 from the core part 210 toward the shell part 220. The seed region 310, the intermediate region 320 and the maintain region 330 are arranged in direction 320 of the shell part 220 from the core part 210. According to an embodiment, the seed region 310 may have length of at least 1 μm in the direction 230 of the shell part 220 from the core part 310.

At least one of the primary particles E1 may compose the secondary particle E2. According to an embodiment, the primary particle E1 may be rod shape extending toward the sell part 220 from the core part 210. That is to say, the primary particles E1 may be rod shape radiating in every direction from the core part 210.

A flow channel for metal ions (for example, lithium ions) and electrolyte (the electrolyte described with reference to FIG. 1) may be provided between the primary particles E1 having rod shape, in other words, between the primary particles E1 extending in the direction 230 toward the shell part 220 from the core part 210, thereby providing a secondary battery with high reliability and enhanced charge/discharge performance.

As shown in FIG. 5, the primary particle E1 may have the a-axis and the c-axis in crystal structure. Namely, the primary particle E1 may be hexagonal structure with the a-axis, the c-axis and axial angles of 90° and 120° from six crystal systems including triclinic, monoclinic, orthorhombic, tetragonal, hexagonal, isometric crystal structure. The a-axis direction length to c-axis direction length ratio may be increasing as going to the shell part 220 of the secondary particle E2 from the core part 210 of the secondary particle E2. As described above, the a-axis direction of the primary particle E1 may radiate from the core part 210 such that the primary particle has rod shape.

If the a-axis direction of the primary particle E1 may radiate from the core part 210 such that the primary particle has rod shape, the flow channel of the metal ion and the electrolyte may be provided on the surface of the primary particle in parallel with the a-axis. In other words, the flow channel may be provided in the direction to the shell part 220 from the core part 210. The flow channel of the metal ion and the electrolyte is provided between surfaces of the primary particle in parallel with the a-axis such that the secondary battery is enhanced in charging/discharging efficiency. If the a-axis direction length of the primary particle is increasing as going to the shell part 220 from the core part 210, the metal ion and the electrolyte can easily move to the core part 210 from the shell part 220 of the secondary particle E2 such that the positive electrode active material for the secondary battery with enhanced charging/discharging efficiency can be provided.

The primary particle E1 may include a seed element 312, an intermediate element 322 and a maintain element 332. The seed element 312, the intermediate element 322 and the maintain element 332 may be independent crystals, respectively. Therefore, the seed element 312, the intermediate element 322 and the maintain element 332 may be discriminated in SEM images.

The seed element 312, the intermediate element 322 and the maintain element 332 may be arranged in the seed region 310, the intermediate region 320 and the maintain region 330, respectively. In other words, the seed element 312 may be arranged near by the core part 210, the maintain element 332 may be arranged near by the shell part 220, and the intermediate element 322 may be arranged between the maintain element 332 and the seed element 312.

According to an embodiment, a plurality of the seed elements 312, the intermediate elements 322 and the maintain elements 332 may be arranged in the seed region 310, the intermediate region 320 and the maintain region 330, respectively.

The primary particle E1 including seed element 312, the intermediate element 322 and the maintain element 332 may be formed of a multiple metals including a first through a third metals. For example, the first metal may be nickel, the second metal may be manganese and the third metal may be cobalt.

According to an embodiment, the seed element 312 may be rod shape as shown in FIG. 5a. In other embodiment, the seed element 312 may be particle shape.

The first metal may show concentration gradient in the seed element 312. The first metal may show continuous concentration gradient. Specifically, concentration slop of the first metal may be continuous.

According to an embodiment, in the direction 230 from the core part 210 to the shell part 220, the concentration of the first metal in the seed element 312 may be declined, thereby an end 312a of the seed element 312 near by the core part 210 may be higher than the other end 312b of the seed element 312 near by the shell part 220 in the concentration of the first metal.

At least one of the second metal and the third metal may show concentration gradient in the seed element 312. According to an embodiment, in the direction 230 from the core part 210 to the shell part 220, concentration of the second metal may be increased in the seed element 312 and the concentration of the first metal may be constant. In another embodiment, concentrations of the second and third metals may be increased in the direction 230 from the core part 210 to the shell part 230.

The intermediate element 322 may have a gradient portion 332a where the first metal shows concentration gradient and a uniform portion 332b where the first metal shows constant concentration. The uniform portion 322b may extend from an end of the gradient portion 322a. The gradient portion 322a and the uniform portion 322b may be in one body. In other words, the gradient portion 322a and the uniform portion 322b may compose one crystal. Although the gradient portion 322a and the uniform portion 322b were discriminately shown in FIG. 5b, the gradient portion 322a and the uniform portion 322b may not be discriminated in a SEM image.

The gradient portion 322a may be adjacent to the seed element 321, and the uniform portion 322b may be adjacent to the maintain element 332. The gradient portion 322a may extend form the other end 321b of the seed element 312.

Concentration of the first metal in the gradient portion 322a may be declined as approaching to the uniform portion 322b. In other words, the first metal in the gradient portion 322a may be declined from the core part 210 to the shell part 220. Therefore, the gradient portion 322a near by the uniform portion 322a may have higher than the gradient portion 322a away from the uniform portion 322a in concentration of the first metal.

At least one of the second metal and the third metal may show concentration gradient in the gradient portion 322a. In an embodiment, according to the direction 230 from the core part 210 to the shell part 220, concentration of the second metal in the gradient portion 322a may be increased while the third metal in the gradient portion 322a shows constant concentration. In another embodiment, concentrations of the second metal and the third metal in the gradient portion 322a may be increased according to the direction 230 from the core part 210 to the shell part 220.

According to an embodiment, concentrations of the second metal and the third metal in the uniform portion 322a may be constant according to the direction 230 from the core part 210 to the shell part 220. Alternatively, at least one of the second metal and the third metal in the uniform portion 322a may show gradient concentration according to the direction 230 from the core part 210 to the shell part 220.

According to an embodiment, the uniform portion 322b may be longer than the gradient portion 322a. Alternatively, according to another embodiment, the uniform portion 322b may be shorter than the gradient portion 322a. According to still another embodiment, the uniform portion 322b and the gradient portion 322a may have substantially equal length. The length of the uniform portion 322b and the gradient portion 322a mean length from the core part 210 to the shell part 220.

The maintain element 332 may show constant concentration of the first metal according to the direction 230 from the core part 210 to the shell part 220. Concentration of the first metal of the maintain element 332 may be lower than concentration of the first metal of the seed element 312.

According to an embodiment, the concentration of the second metal and the third metal in the maintain element 332 may be constant according to the direction from the core part 210 to the shell part 220. Alternatively, according to another embodiment, at least one of the second metal and the third metal in the maintain element 332 may show concentration gradient according to the direction from the core part 332 to the shell part 220.

According to an embodiment, the maintain element 332 may be longer than the seed element 312 in the direction from the core part 210 to the shell part 220. Alternatively, according to an embodiment, length of the maintain element 332 may be equal or shorter than length of the seed element 312 in the direction from the core part 210 to the shell part 220.

According to an embodiment, the positive electrode active material may include the primary particle E1 and the secondary particle E3 formed by at least one of the primary particles E2, and the seed region where the seed element 312 with concentration gradient of the first metal may have length of at least 1 μm. Therefore, the intermediate element 322 and/or the maintain element 332 formed after the seed element 312 may have rod shape extending toward the shell part 220 from the core part 210, thereby providing flow channel into the interior of the secondary particle E2 for metal ions (for example, lithium ions) and electrolyte.

If the seed region 310 where the seed element 312 with concentration gradient of metal is arranged is shorter than 1 μm in the direction from the core part 210 to the shell part 220, the intermediate element 322 and/or the maintain element 332 formed after the seed element 312 may not be formed of rod shape. Thus, metal ions and electrolyte flow channel cannot be provided to the interior of the secondary particle 322, thereby the secondary battery may be declined in charge/discharge efficiency and life time characteristic.

As described above, however, according to an embodiment, the length of the seed region 310 may be at least 1 μm in the direction from the core part 210 to the shell part 220. Thus, the primary particles E1 including the maintain element 332 may have rod shape extending to radiate direction from the core part 210, thereby providing a secondary battery of high efficiency, high reliability and long life time.

According to an embodiment of the present invention, the seed element 312 of which concentration of the first metal (for example, nickel) is decreasing as going in the direction from the core part 210 to the shell part 220 may be formed followed by forming the rod shaped maintain element 332 of which concentration of the first metal (for example, nickel) is constant. Thus, the primary particle E1 including the seed element 312, the intermediate element 322 and the maintain element 332 may be formed as rod shape, spontaneously with providing a positive electrode active material with maximum concentration of the first metal in the secondary particle E2.

If the concentration of the first metal in the primary particle E1 is gradually decreasing as going to the shell part 220 from the core part 210 for manufacturing the primary particle E1 in the form of rod shape, the positive electrode active material including the primary particle E1 and the secondary particle E2 may be declined in characteristics caused by the first metal (for example, capacity and/or safety).

As described above, however, according to an embodiment, a positive electrode active material may be provided with maximum concentration of the first metal while the primary particle E1 maintains the rod shape. Therefore, a secondary battery may be provided with maximum characteristics caused by the first metal (for example, capacity and/or safety).

The above described embodiment of the present invention, it was described that the secondary particle E2 includes the intermediate region 320, the primary particle E1 includes the intermediate element which is arranged in the intermediate region 320, however, the intermediate region 320 and the intermediate element 322 may not be exist in the secondary particle E2 and the primary particle E1.

The characteristics evaluation of the positive electrode active material and the secondary battery including the same according to embodiments of the present invention will be described below.

Manufacturing of the Positive Electrode Active Material According to the Embodiment.

Nickel manganese cobalt hydroxide was manufactured using nickel sulfate, manganese sulfate, cobalt sulfate according to the embodiment of the present invention. Lithium hydroxide was mixed in the nickel manganese cobalt hydroxide followed by heating and firing, thereby a positive electrode active material with a secondary particle including lithium nickel manganese cobalt was manufactured.

In the concrete, a primary particle and a secondary particle was manufactured with including a seed element of which concentrations of nickel, cobalt and manganese are gradient by varying mol ratio of the metal aqueous solution (nickel sulfate, manganese sulfate, cobalt sulfate) and a maintain element of which concentrations of nickel, cobalt and manganese are constant by maintaining mol ratio of the metal aqueous solution.

As shown in [Table 15], secondary particles were manufactured according to Example 1 through Example 9. The lengths of seed regions, where the seed element with decreasing nickel concentration was arranged, were 5.5 μm, 5 μm, 4.5 μm, 4 μm, 3 μm, 2.5 μm, 2 μm, 1.5 μm and 1 μm in Example 1 through Example 9, respectively. The lengths of maintain regions, where the maintain element with constant nickel concentration is arranged were 0.5 μm, 1 μm, 1.5 μm, 2 μm, 3 μm, 3.5 μm, 4 μm, 4.5 μm and 5 μm in Example 1 through Example 9, respectively.

TABLE 15

| class | length of seed region(μm) | length of maintain region(μm) |
|---|---|---|
| Example 1 | 5.5 | 0.5 |
| Example 2 | 5 | 1 |
| Example 3 | 4.5 | 1.5 |
| Example 4 | 4 | 2 |
| Example 5 | 3 | 3 |
| Example 6 | 2.5 | 3.5 |
| Example 7 | 2 | 4 |
| Example 8 | 1.5 | 4.5 |
| Example 9 | 1 | 5 |

Comparison of SEM Images

Figure 26A:
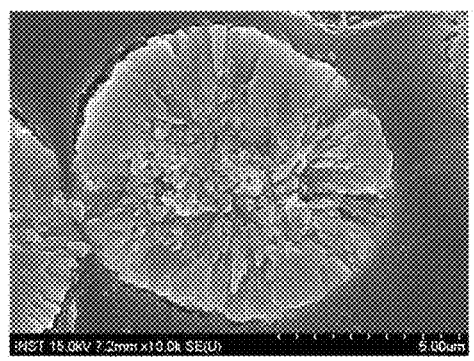
FIGS. 26A and 26B: SEM images of the cross-section of the secondary particles in the positive electrode active which is manufactured in embodiments of the present invention.
Figure 26A:
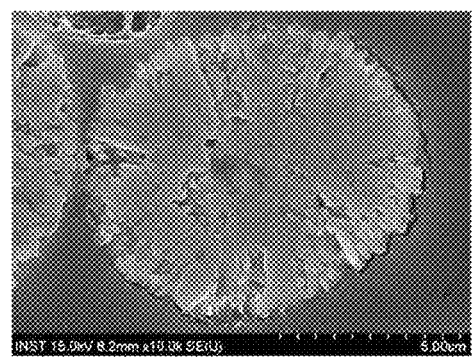
Figure 26A:
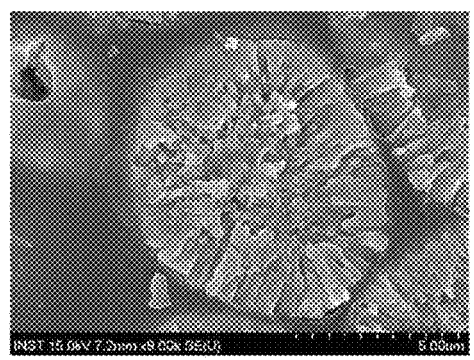
Figure 26A:
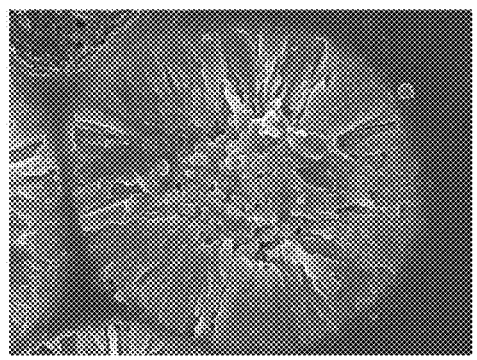
Figure 26B:
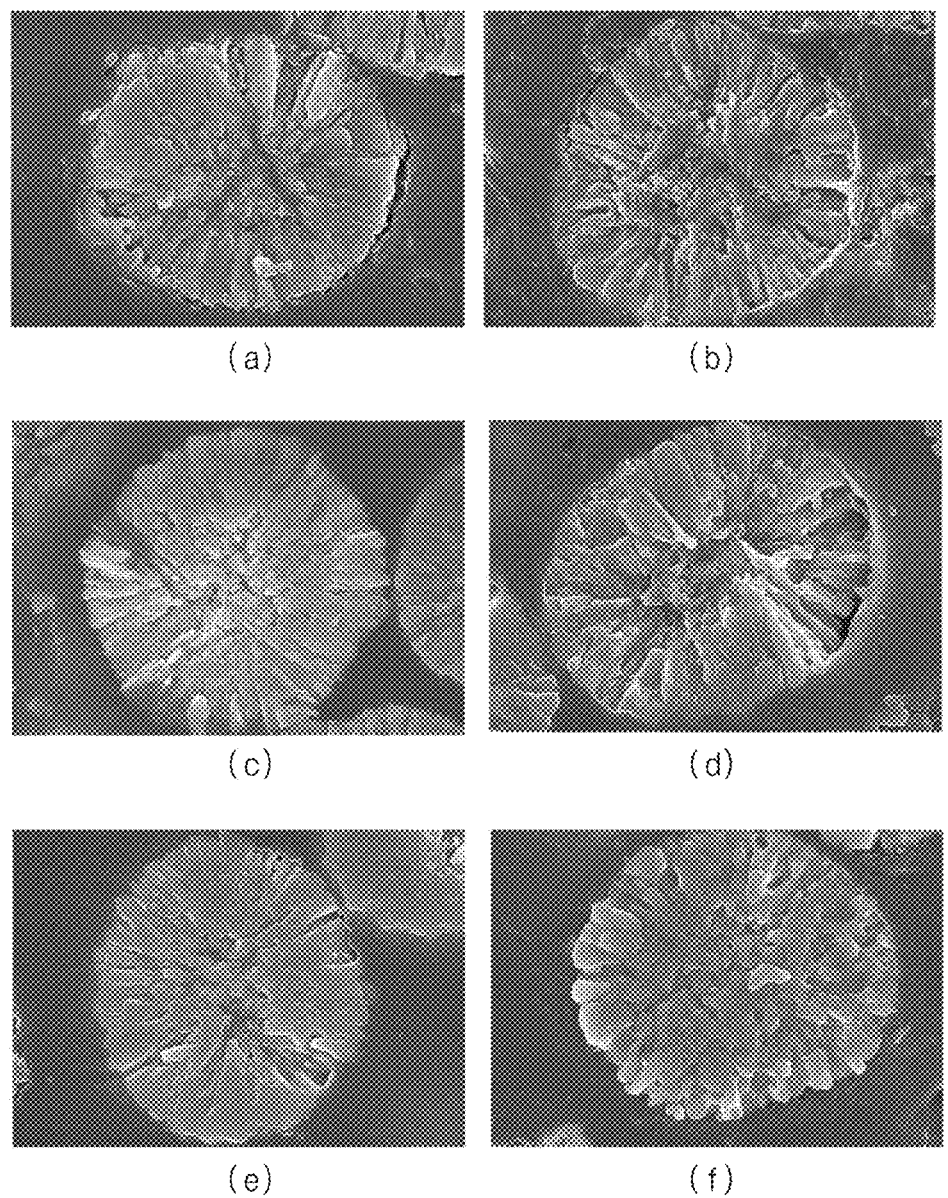

FIGS. 26a and 26b are SEM images of the secondary particle in the positive electrode active material manufactured in the embodiment of the present invention.

Referring to FIGS. 26a and 26b, (a) through (d) of FIG. 26a respectively represent SEM images of cross-sections of the secondary particles which were manufactured in Example 1 through Example 4, (a) through (e) of FIG. 26b respectively represent SEM images of cross-sections of the secondary particles which were manufactured in Example 5 through Example 9. FIG. 26b (f) presents a cross-section of bulk type positive electrode active material without rod shaped primary particle in Comparative Example according to the embodiment of the present invention.

As shown in FIGS. 26a and 26b, if the length of the seed region where the seed element is arranged is at least 1 μm, it may be confirmed that the primary particle was manufactured in the form of rod shape extending in the direction from the core part to the shell part of the secondary particle.

Result of EPMA (Electron Probe Micro-Analysis)

Figure 27A:
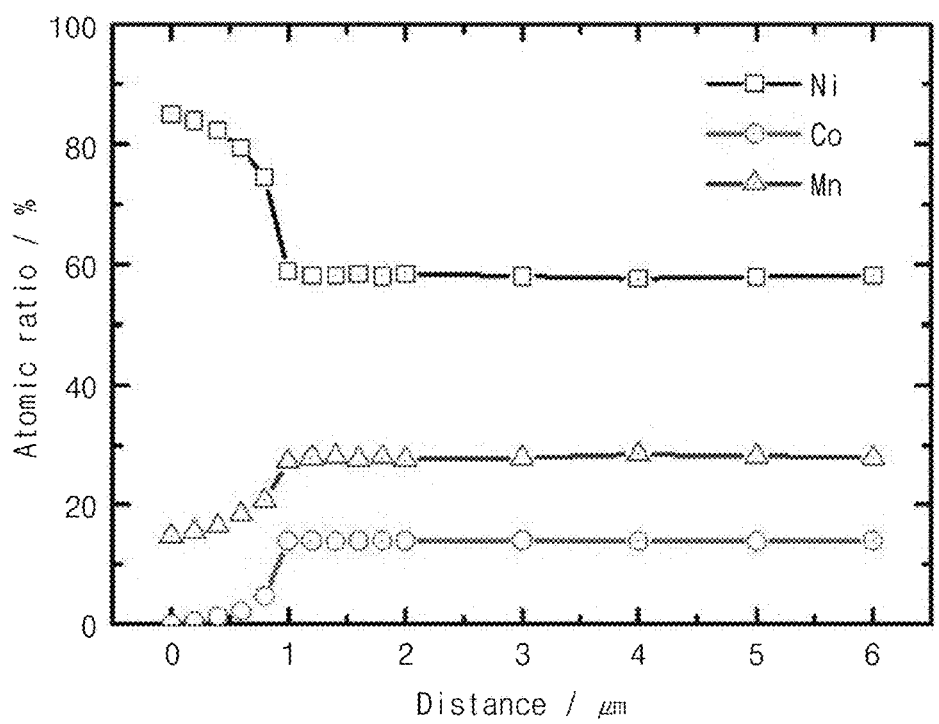
FIGS. 27A and 27B: EPMA graphs of the cross-section of the primary particles in the positive electrode active which is manufactured in embodiments of the present invention.
Figure 27B:
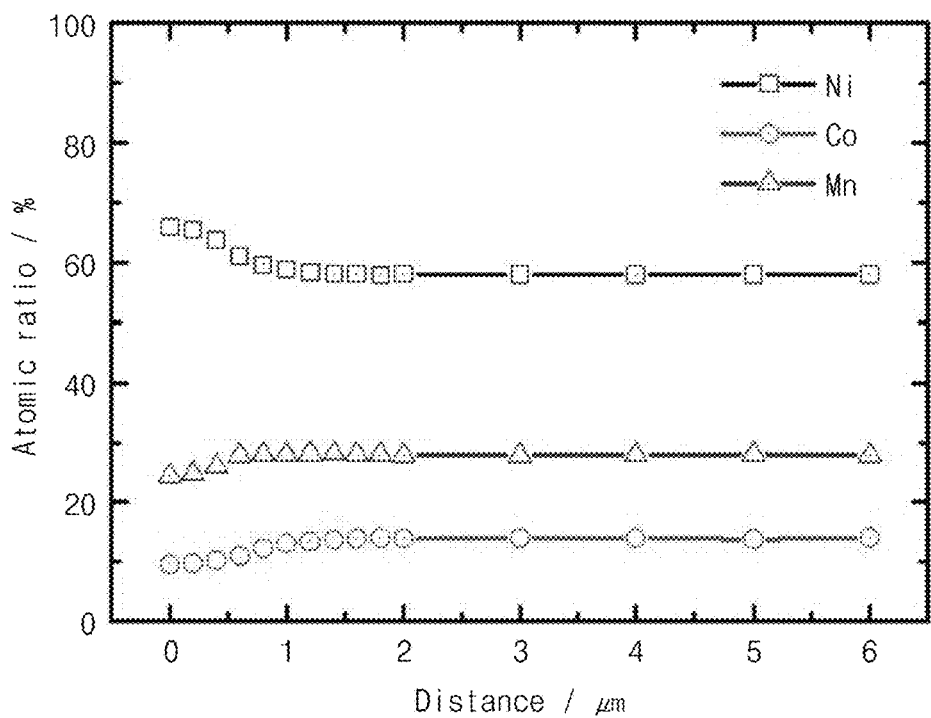

FIGS. 27a and 27b represent an EPMA graph of the primary particle in the positive electrode active material manufactured by the embodiment of the present invention.

Referring to FIGS. 27a and 27b, FIG. 27a is an EPMA result of nickel manganese cobalt hydroxide precursor of which length of the seed region with concentration gradient of nickel, cobalt and manganese according to Example 9 of the present invention is 1 μm, and FIG. 27b is an EPMA result of lithium nickel manganese cobalt secondary particle of which length of the seed region with concentration gradient of nickel, cobalt and manganese according to Example 9 of the present invention is 1 μm, As shown in FIGS. 27a and 27b, nickel, cobalt and manganese have concentration gradient in the seed region of the nickel manganese cobalt hydroxide precursor and cobalt and manganese in the maintain region have constant concentration. If the secondary particle of lithium nickel manganese cobalt are formed by mixing lithium hydroxide followed by heating and firing, the nickel, cobalt, manganese are dispersed by heat treatment such that nickel, cobalt and manganese decline in concentration gradient. As a result, it can be confirmed that concentrations of nickel, cobalt and manganese in the secondary particle are changed after the heat treatment.

Evaluating Discharge Capacity Properties and Life Time Characteristics

Figure 28A:
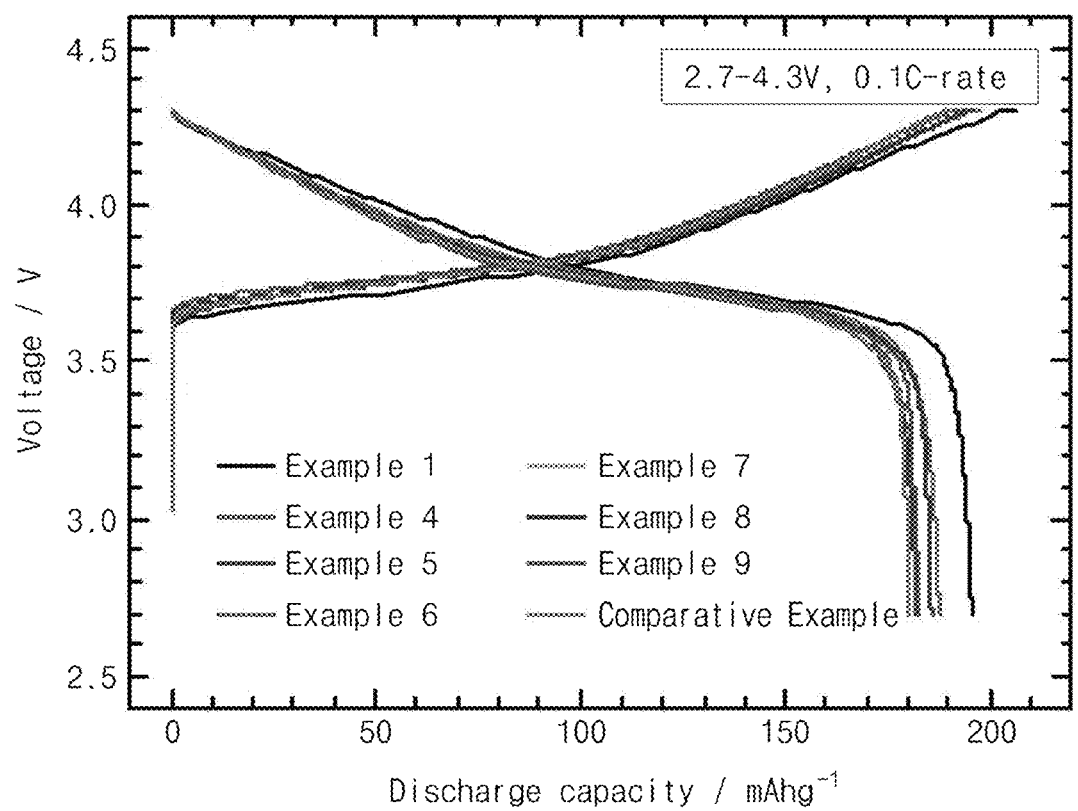
FIG. 28A: a discharging capacity property graph of the secondary battery which includes the positive electrode active material according to the present invention.
Figure 28B:
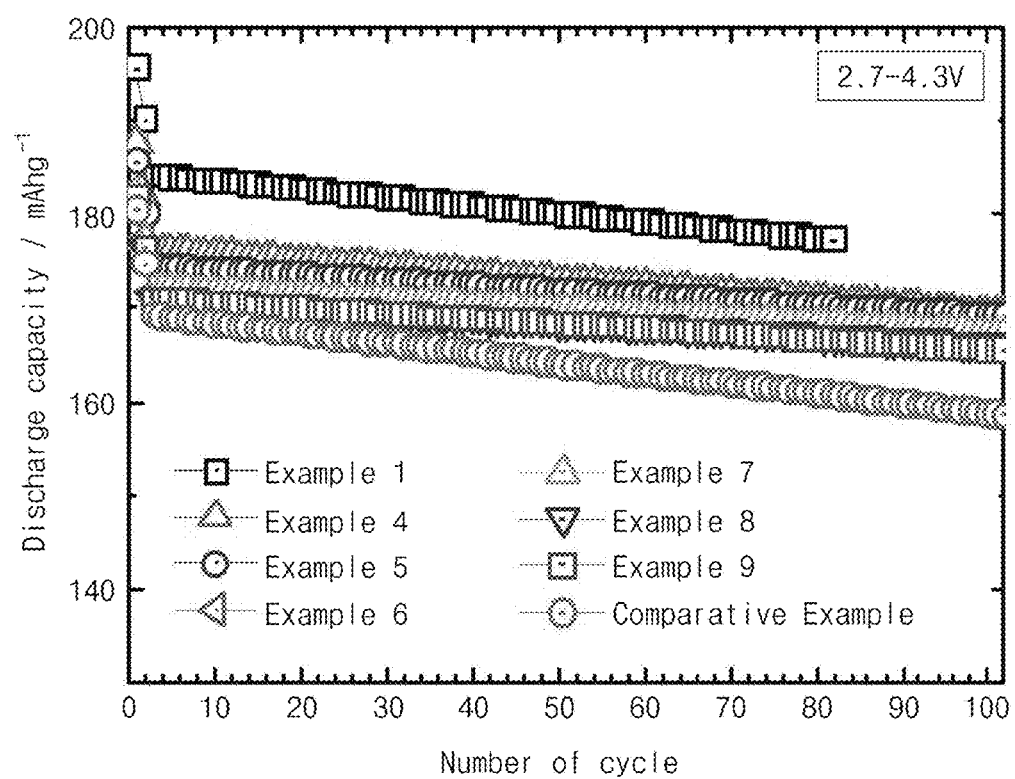
FIG. 28B: a life time characteristic graph of the secondary battery which includes the positive electrode active material according to the present invention.

FIG. 28a is a graph representing discharge capacity properties of the secondary battery which includes the positive electrode active material according to the embodiment of the present invention, and FIG. 28b is a graph representing life time characteristics of the secondary battery which includes the positive electrode active material according to the embodiment of the present invention.

As shown in FIGS. 28a and 28b, discharge capacity properties and life time characteristics were evaluated to secondary batteries which include positive electrode active materials according to Examples 1, 4 through 9 and Comparative Example.

As shown in FIGS. 28a and 28b, the secondary battery formed by the positive electrode active material having rod shaped primary particle which include the seed element having concentration gradient of nickel, cobalt and manganese and the maintain element having constant concentration of nickel, cobalt and manganese is superior than the secondary battery formed by bulk shaped positive electrode active material without rod shaped primary particle in the discharge capacity property and the life time characteristic.

Evaluating Thermal Safety

Figure 29A:
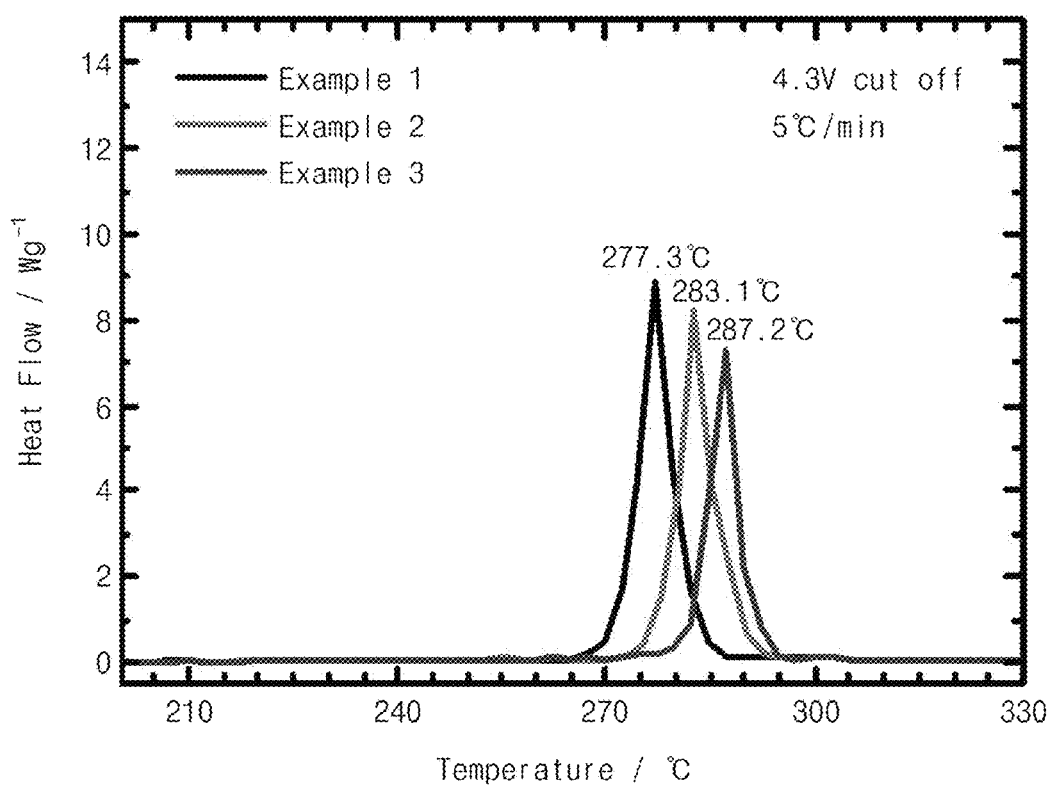
FIGS. 29A and 29B: thermal safety characteristic graphs of the secondary battery which includes the positive electrode active material according to the present invention.
Figure 29B:
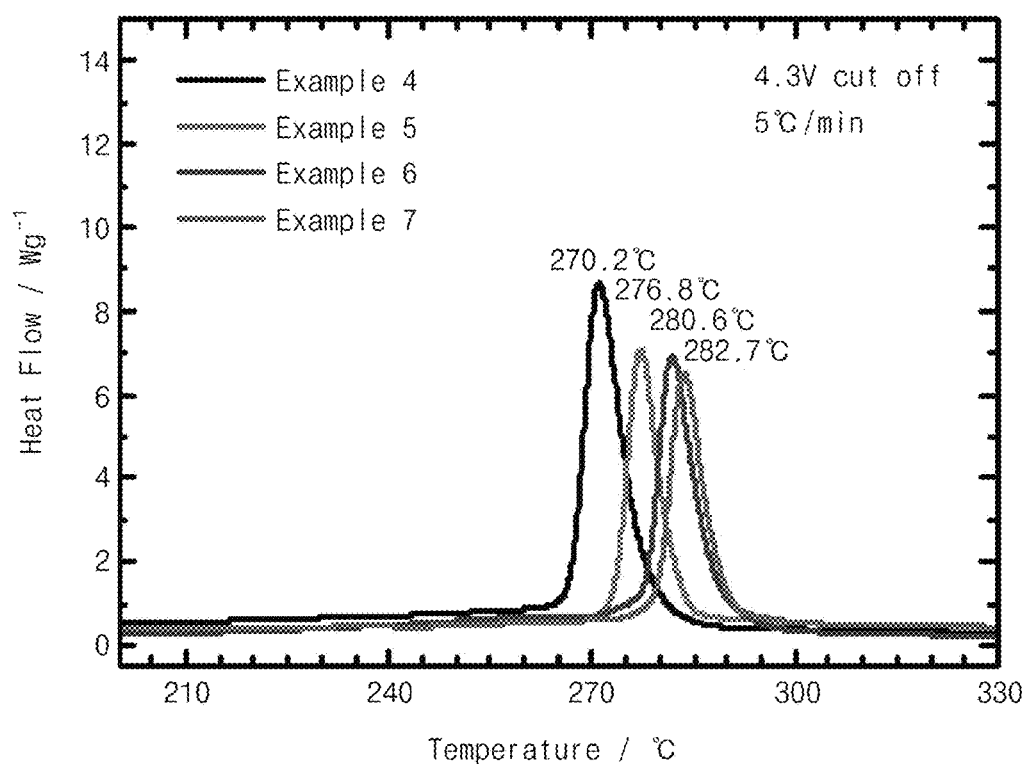

FIGS. 29a and 29b are graphs representing thermal safety of the secondary battery which includes the positive electrode active material according to the embodiment of the present invention.

As shown in FIGS. 29a and 29b, the thermal safeties were evaluated in condition of cut-off 4.3V, 5° C./min using DSC (Differential scanning calorimeter) to secondary batteries which include the positive electrode active material according to Examples 1 through 7 of the above described present invention. the secondary batteries according to Examples 1 through 7 respectively measured 277.3° C., 283.1° C., 287.2° C., 270.2° C., 276.8° C., 280.6° C. and 282.7° C. of DSC temperature, and 846.9 J/g, 801.6 J/g, 727.3 J/g, 843.1 J/g, 744.4 J/g, 717.8 J/g, 및 694.2 J/g of calorie.

According to embodiments of the present invention, it can be confirmed that the efficient method for improving thermal safety of the secondary batteries is forming of the secondary battery using the positive electrode active material with rod shaped primary particle which includes the seed element having concentration gradient of nickel, cobalt and manganese and the maintain element having constant concentration of nickel, cobalt and manganese.

The above-described secondary battery according to the embodiments of the present invention may be applicable to the variety of applications, for example electric vehicles described hereinafter.

Figure 30:
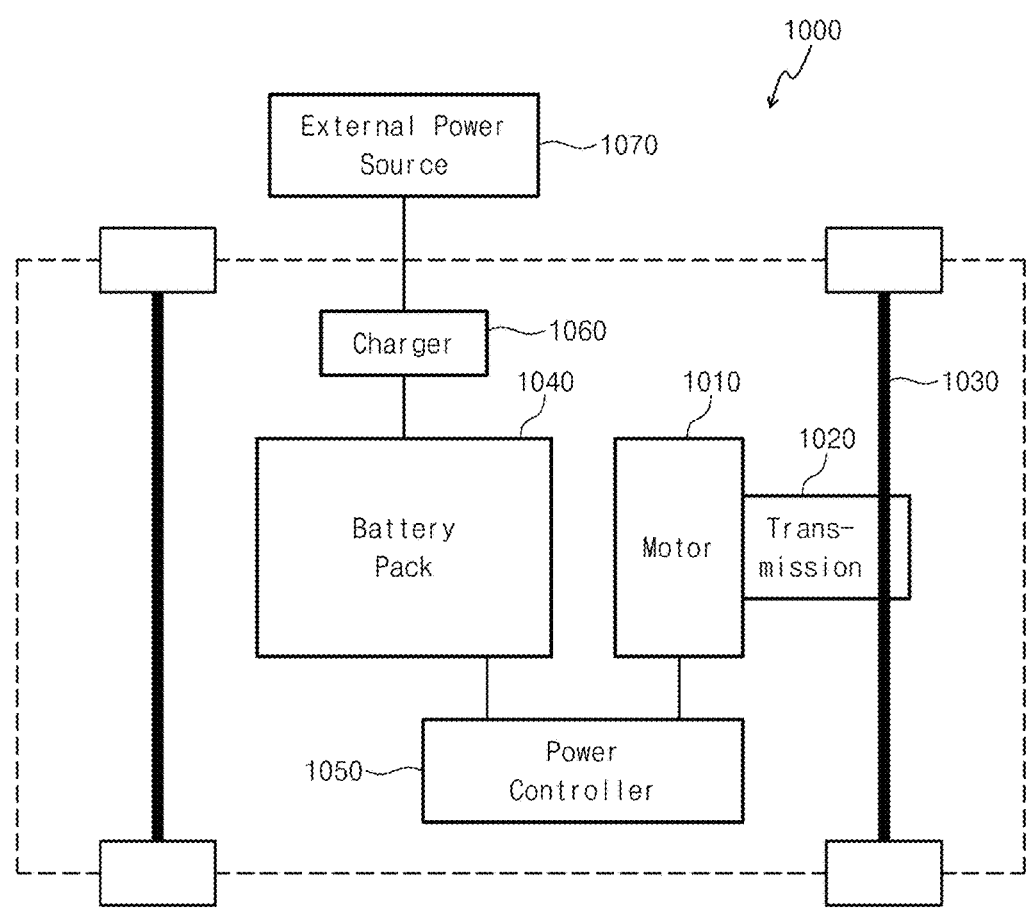
FIG. 30: a block diagram of the electric vehicle which have the secondary battery including the positive electrode active material according to the present invention.

FIG. 30 is a block diagram of an electric vehicle which has the secondary battery including the positive electrode active material according to the embodiment of the present invention.

An electric vehicle 1000 according to an embodiment of the present invention may have at least one of a motor 1010, a transmission, an accelerator 1030, a battery pack 1040, a power controller 1050 and a charger 1060.

The motor 1010 can transform electric energy of the battery pack 1040 into kinetic energy. The motor 1010 may provide the transformed kinetic energy with the accelerator 1020 through the transmission 1020. The motor 1010 may be composed of a single motor or a plurality of motors. For example, the motor 1010 may be composed of a front-wheel motor supplying kinetic energy to a front-wheel accelerator and a rear-wheel motor supplying kinetic energy to a rear-wheel accelerator if the motor 1010 is composed of a plurality of motors.

The transmission 1020 may be located between the motor 1010 and the accelerator 1030, change the kinetic energy from the motor 1010 followed by supplying to the accelerator 1030 so as to be adequate for drive circumstance of drivers' demand.

The battery pack 1040 may store electric energy from the charger 1060 and supply the stored electric energy to the motor 1010. The battery pack 1040 may supply electric energy to the motor 1010 directly, or supply electric energy to the motor 1010 through the power controller 1050.

The battery pack 1040 may formed of at least one battery cell. The battery cell may include the lithium air secondary battery, however, it is not limit to the above and the battery cell may include various secondary batteries such as a lithium based secondary battery. The battery cell may be referred to a discrete battery, and the battery pack may be referred to a battery group which is composed of discrete batteries interconnected each other in order to possess required voltage and/or capacity.

The power controller 1050 may control the battery pack 1040. Namely, the power controller 1050 may control at least one of voltage, current, waveform and etc. from the battery pack 1040 in accordance with demand of the motor 1010. Therefore, the power controller 1050 may include at least one of passive power device and an active power device.

The charger 1060 may receive power from an external power supplier 10710 as shown in FIG. 30 and supply to the battery pack 1040. The charger 1060 may generally control charging status, for example the charger 1060 may control on/off of charging and charging speed.

According to the embodiment of the present invention, the positive electrode active material includes a secondary particle composed of the primary particle and at least one of the primary particles. The secondary particle may include the seed region where the primary particle having concentration gradient of the first metal is disposed and the maintain region where the primary particle having constant concentration of the first metal is disposed. The seed region has length of 1 μm. Therefore, the primary particle can be formed of rod shape extending toward shell part from the core part of the secondary particle while concentration of the first metal is maximized. Thereby, the secondary battery can be provided with high performance, high capacity and long life time.

In the positive electrode active material precursor for a lithium secondary battery of the present invention and a positive electrode active material manufactured by using thereof, the a-axis direction length to c-axis direction length ratio is changed primary particle from the core part to the shell part in the interior of the secondary particle, and the a-axis orientation of the primary particle is headed to the core part of the positive electrode active material as a secondary particle, and the particles are adjoining each other and grow to a fixed route. Accordingly, it has effects that insertion and secession of a lithium ion may become easier, and high capacity can be obtained by reduced electric resistance between particles.

While the invention has been described with respect to the above specific embodiments, it should be recognized that various modifications and changes may be made and also fall within the scope of the invention as defined by the claims that follow.

What is claimed is:
1. A positive electrode active material comprising:
   a primary particle formed of a plurality of metals including a first metal; and
   a secondary particle formed of at least one of the primary particle, wherein the secondary particle includes
      a core part,
      a shell part,
      a seed region where the primary particle having concentration gradient of the first metal is disposed and
      a maintain region where the primary particle having constant concentration of the first metal is disposed,
   wherein the seed region is adjacent to the core part,
   wherein the maintain region is adjacent to the shell part,
   wherein a length of the seed region in a direction from the core part to the shell part is at least 1 μm,
   wherein a crystal structure of the primary particle has an a-axis and a c-axis,
   wherein the a-axis is in a direction from the core part to the shell part of the secondary particle, and a c-axis is perpendicular to the a-axis, and
   wherein a ratio of an a-axis direction length to a c-axis direction length of the primary particle gradually increases from the core part to the shell part of the secondary particle.

2. The positive electrode active material of claim 1, wherein the primary particle comprises:
a seed portion disposed in the seed region and having concentration gradient of the first metal; and
a maintain portion disposed in the maintain region, having constant concentration of the first metal and extending to the shell part from the core part.

3. The positive electrode active material of claim 2, wherein
the secondary particle further comprises an intermediate region disposed between the seed region and the maintain region,
the primary particle further comprises an intermediate portion disposed in the intermediate region, and
the intermediate portion comprises a gradient portion having concentration gradient of the first metal and a uniform portion having constant concentration of the first metal.

4. The positive electrode active material of claim 2, wherein a concentration of the first metal in the seed portion decreases as going in a direction from the core part to the shell part.

5. The positive electrode active material of claim 2, wherein the seed portion is higher than the maintain portion in concentration of the first metal.

6. The positive electrode active material of claim 2, wherein the seed portion and/or the maintain portion have a rod shape radiating in a direction from the core part to the shell part.

7. The positive electrode active material of claim 2, wherein the plurality of the metals further comprises a second metal and a third metal, at least one of the second metal and the third metal show increasing concentration gradient in the seed portion.

8. The positive electrode active material of claim 1, wherein the maintain region is longer than the seed region in a direction from the core part to the shell part.

9. The positive electrode active material of claim 1, wherein the first metal includes nickel (Ni).

10. A positive electrode active material comprising:
a primary particle having an intermediate portion, the intermediate portion including a gradient portion which shows concentration gradient of a first metal and a uniform portion which extends from an end of the gradient portion and shows constant concentration of the first metal; and
a secondary particle composed of at least one of the primary particle, the secondary particle comprising a core part and a shell part,
wherein a crystal structure of the primary particle has an a-axis and a c-axis,
wherein the a-axis is in a direction from the core part to the shell part of the secondary particle, and a c-axis is perpendicular to the a-axis, and
wherein a ratio of an a-axis direction length to a c-axis direction length of the primary particle adjacent to the core part of the secondary particle is shorter than the ratio of the primary particle adjacent to the shell part of the secondary particle.

11. The positive electrode active material of claim 10, wherein the gradient portion and the uniform portion are in one body.

12. The positive electrode active material of claim 10, wherein the secondary particle further comprises a seed region adjacent to the core part and a maintain region adjacent to the shell part, and
wherein the primary particle comprises:
a seed portion disposed in the seed region and having concentration gradient of the first metal; and
a maintain portion disposed in the maintain region, extending toward the shell part from the seed portion and having constant concentration of the first metal.

13. The positive electrode active material of claim 12, wherein the intermediate portion is disposed between the seed portion and the maintain portion, the gradient portion is adjacent to the seed element and the uniform portion is adjacent to the maintain portion.

14. The positive electrode active material of claim 10, wherein the concentration of the first metal in the gradient portion decreases as approaching to the uniform portion.

15. A secondary battery comprising:
the positive electrode active material according to claim 1;
a negative electrode disposed on the positive electrode; and
an electrolyte between the positive electrode and the negative electrode.

16. A positive electrode active material comprising:
a primary particle including a plurality of metal; and
a secondary particle including a plurality of the primary particle,
wherein the secondary particle has a core part and a shell part,
wherein the primary particle in the shell part is longer than the primary particle in the core part wherein the primary particle has an a-axis and a c-axis in crystal structure, wherein the a-axis of the primary particle is aligned in a direction from the core part of the secondary particle to the shell part of the secondary particle, and wherein an a-axis direction length of the primary particle increases as approaching to the shell part of the secondary particle from the core part of the secondary particle.

17. The positive electrode active material of claim 16, wherein the secondary particle includes a seed region, and a length of the seed region is at least 1 μm.

18. The positive electrode active material of claim 16, wherein the secondary particle includes a seed region, and the seed region is adjacent to the core part of the secondary particle, and the secondary particle further includes a maintain region where concentration of the metal is constant, the maintain region adjacent to the shell part of the secondary particle.

19. The positive electrode active material of claim 16, wherein the secondary particle includes a seed region, and the metal concentration in the seed region decreases as approaching to the shell part of the secondary particle from the core part of the secondary particle.

* * * * *